(12) United States Patent
Canich et al.

(10) Patent No.: US 8,455,589 B2
(45) Date of Patent: Jun. 4, 2013

(54) POLYMERIZATION PROCESS AND ADHESIVES THEREFROM

(75) Inventors: Jo Ann M. Canich, Houston, TX (US); Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/397,263

(22) Filed: Feb. 15, 2012

(65) Prior Publication Data

US 2012/0149829 A1 Jun. 14, 2012

Related U.S. Application Data

(60) Division of application No. 12/480,988, filed on Jun. 9, 2009, now Pat. No. 8,143,353, which is a continuation-in-part of application No. 12/016,346, filed on Jan. 18, 2008, now Pat. No. 7,812,104.

(51) Int. Cl.
| | |
|---|---|
| *C08L 23/10* | (2006.01) |
| *C08L 23/12* | (2006.01) |
| *C08F 4/653* | (2006.01) |
| *C08F 4/6592* | (2006.01) |

(52) U.S. Cl.
USPC ........... 525/240; 526/113; 526/114; 526/133; 526/160; 526/348; 526/943

(58) Field of Classification Search
USPC .................. 525/240; 526/113, 114, 133, 160, 526/943
See application file for complete search history.

(56) References Cited

U.S. PATENT DOCUMENTS

| | | | |
|---|---|---|---|
| 5,516,848 A | 5/1996 | Canich et al. | |
| 5,539,056 A | 7/1996 | Yang et al. | |
| 6,147,180 A | 11/2000 | Markel et al. | |
| 6,184,327 B1 | 2/2001 | Weng et al. | |
| 6,248,832 B1 | 6/2001 | Peacock | |
| 6,323,284 B1 | 11/2001 | Peacock | |
| 7,223,822 B2 | 5/2007 | Abhari et al. | |
| 7,276,567 B2 | 10/2007 | Voskoboynikov et al. | |
| 7,294,681 B2 | 11/2007 | Jiang et al. | |
| 7,812,104 B2 | 10/2010 | Canich et al. | |
| 2004/0127614 A1 | 7/2004 | Jiang et al. | |
| 2004/0138392 A1 | 7/2004 | Jiang et al. | |
| 2004/0220320 A1 | 11/2004 | Abhari et al. | |
| 2004/0220336 A1 | 11/2004 | Abhari et al. | |
| 2004/0249046 A1 | 12/2004 | Abhari et al. | |
| 2005/0261449 A1 | 11/2005 | Voskoboynikov et al. | |
| 2007/0293640 A1 | 12/2007 | Jiang et al. | |

FOREIGN PATENT DOCUMENTS

| | | |
|---|---|---|
| EP | 0 366 411 | 5/1990 |
| EP | 0 527 589 | 2/1993 |
| EP | 0 728 773 | 8/1996 |

*Primary Examiner* — Caixia Lu

(57) ABSTRACT

This invention relates to a propylene polymer comprising a component having a crystallinity of 10% or less and a component having a crystallinity of 20% or more, said propylene polymer having:

a) a melting point of X° C. or more where $X=-0.0038(Tp)^2+0.36(Tp)+150$, where Tp is the temperature of polymerization in ° C.;

b) an Mw of 10,000 g/mol or more;

c) a heat of fusion of from 1-70 J/g;

d) Stereodefects per 10,000 monomer units of Y or less where $Y=2.35(Tp)-100$ (where Tp is the temperature of polymerization in ° C.) for the portion of the blend that is insoluble in hexane at 23° C.;

e) a dot T-Peel on Kraft paper of 1 N or more; and f) a branching factor of 0.98 or less, where the branching factor is the ratio of g' measured at Mz to g' measured at Mw, and process to produce such polymers.

19 Claims, No Drawings

POLYMERIZATION PROCESS AND ADHESIVES THEREFROM

PRIORITY CLAIM

This application is a divisional of U.S. Ser. No. 12/480,988 filed Jun. 9, 2009 now U.S. Pat. No. 8,143,353, which is a continuation in part of U.S. Ser. No. 12/016,346, filed on Jan. 18, 2008 now U.S. Pat. No. 7,812,104. This application is related to U.S. Ser. No. 11/078,920, filed Mar. 11, 2005 (now U.S. Pat. No. 7,276,567) which claims the benefit of and priority to U.S. Ser. No. 60/562,861, filed Apr. 16, 2004.

FIELD OF THE INVENTION

This invention relates to polymerization processes and adhesives made using the polymers produced therefrom.

BACKGROUND OF THE INVENTION

For some applications, such as adhesives, individual polymers do not possess the necessary combination of properties. For example, it has proved difficult to develop a single component adhesive that exhibits a good combination of properties, such as adhesion at low and high temperatures, short set time, thermal stability and mechanical strength. In an attempt to address this problem, individual polyolefins having different characteristics are often blended together in the hope of combining the positive attributes of the individual components. However, typically the result is a blend which displays an average of the individual properties of the individual polymers, including the less desirable properties. For example EP 0 527 589 discloses blends of flexible, low molecular weight amorphous polypropylene with higher molecular weight isotactic polypropylene to obtain compositions with balanced mechanical strength and flexibility. These compositions show better flexibility compared to that of the isotactic polypropylene alone, but are still lacking in other physical attributes. Physical blends also have the problems of inadequate miscibility. Unless the components are selected for their compatibility they can phase separate or low molecular weight components can migrate to the surface. Additional cost associated with compounding also makes these products less economically attractive.

Reactor blends, also called intimate blends (a composition comprising two or more polymers made in the same reactor or in a series of reactors) are often used to address these issues, however finding catalyst systems that will operate under the same environment to produce different polymers has been a challenge.

Multiple catalyst systems have been used in the past to produce reactor blends of various polymers and other polymer compositions. Reactor blends and other one-pot polymer compositions are often regarded as superior to physical blends of similar polymers. For example U.S. Pat. No. 6,248,832 discloses a polymer composition produced in the presence of one or more stereospecific metallocene catalyst systems and at least one non-stereospecific metallocene catalyst system. The resultant polymer has advantageous properties over the physical blends disclosed in EP 0 527 589 and U.S. Pat. No. 5,539,056.

Thus there has been interest in the art in developing multiple catalyst systems to produce new polymer compositions. For example, U.S. Pat. No. 5,516,848 discloses the use of two different cyclopentadienyl based transition metal compounds activated with alumoxane or non-coordinating anions. In particular, the examples disclose, among other things, catalyst compounds in combination, such as $Me_2Si(Me_4C_5)(N-c-C_{12}H_{23})TiCl_2$ and $rac-Me_2Si(H_4Ind)_2ZrCl_2$, or $Me_2Si(Me_4C_5)(N-c-C_{12}H_{23})TiCl_2$ and $Me_2Si(Ind)_2HfMe_2$, (Ind=indenyl, $H_4Ind$=tetrahydroindenyl, Me=methyl) activated with activators such as methylalumoxane or N,N-dimethyl anilinium tetrakis(pentafluorophenyl) borate, to produce polypropylenes having bimodal molecular weight distributions (Mw/Mn), varying amounts of isotacticity (from 12-52 wt % isotactic PP in the product in Ex 2, 3 and 4), and having weight average molecular weights over 100,000, and some even as high as 1,200,000 for use as thermoplastics. Likewise, U.S. Pat. No. 6,184,327 discloses a thermoplastic elastomer comprising a branched olefin polymer having crystalline sidechains and an amorphous backbone wherein at least 90 mol % of the sidechains are isotactic or syndiotactic polypropylene and at least 80 mole % of the backbone is atactic polypropylene produced by a process comprising: a) contacting, in solution, at a temperature from about 90° C. to about 120° C., propylene monomers with a catalyst composition comprising a chiral, stereorigid transition metal catalyst compound capable of producing isotactic or syndiotactic polypropylene; b) copolymerizing the product of a) with propylene and, optionally, one or more copolymerizable monomers, in a polymerization reactor using an achiral transition metal catalyst capable of producing atactic polypropylene; and c) recovering a branched olefin polymer. Similarly U.S. Pat. No. 6,147,180 discloses the synthesis of a thermoplastic polymer composition, which is produced by first polymerizing monomers to produce at least 40% vinyl terminated macromonomers and then copolymerizing the macromonomers with ethylene. In addition U.S. Pat. No. 6,323,284 discloses a method to produce thermoplastic compositions (mixtures of crystalline and amorphous polyolefin copolymers) by copolymerizing alpha-olefins and alpha, omega dienes using two separate catalyst systems.

Likewise others have experimented with multiple stage processes to produce new polymer compositions. For example EP 0 366 411 discloses a graft polymer having an EPDM backbone with polypropylene grafted thereto at one or more of the diene monomer sites through the use of a two-step process using a different Ziegler-Natta catalyst system in each step. This graft polymer is stated to be useful for improving the impact properties in blended polypropylene compositions.

US Pat. Appl. Pub. No. 2004/0138392, published Jun. 15, 2004, discloses a continuous process for producing an adhesive with a first component having a crystallinity of 5% or less and a second component having a crystallinity of 20% or more. The in-reactor blends show good balance among adhesion at both high and low temperature as well as set time. The process comprises 1) selecting a first catalyst component capable of producing a polymer having an Mw of 100,000 or less and a crystallinity of 5% or less under selected polymerization conditions; 2) selecting a second catalyst component capable of producing polymer having an Mw of 100,000 or less and a crystallinity of 20% or more at the selected polymerization conditions; 3) contacting, in a solvent and in a reaction zone under the selected polymerization conditions, the catalyst components in the presence of one or more activators with one or more $C_3$-$C_{20}$ olefins, and, optionally one or more diolefins; 4) at a temperature of greater than 100° C.; 5) at a residence time of 120 minutes or less; 6) wherein the ratio of the first catalyst to the second catalyst is from 1:1 to 50:1; 7) wherein the activity of the catalyst components is at least 50 kilograms of polymer per gram of the catalyst compounds; and wherein at least 80% of the olefins are converted to polymer; 8) withdrawing polymer solution from the reaction zone; 9) removing at least 10% solvent from the polymer solution; 10) quenching the reaction; 11) devolatilizing the polymer solution to form molten polymer; 12) combining the molten polymer and one or more additives in a static mixer; 13) removing the polymer combination from the static mixer; and 14) pelletizing or drumming the polymer combination. The selected stereo-specific catalysts are only capable of producing polymers with relatively low molecular weight and melting temperatures.

Likewise certain dual catalysts systems have been disclosed that produce branched polymers in single or multiple reactors that can be used in, inter alia, adhesive applications. See for example U.S. Pat. No. 7,223,822, US 2007/0293640, US 2004/0220336, US 2004/0220320, US 2004/0249046 and US 2004/0127614.

Another reference of interest is EP 0 728 773 A1.

It is highly desirable to have polyolefin based adhesives and thermoplastic polyolefins with high melting temperature for high temperature resistance applications. Using a catalyst capable of producing polymer with higher molecular weight and/or higher melting temperature also implies that the process can be operated at higher reaction temperature for better process economics.

According to the present invention, it has now been found certain N-bonded carbazol-9-yl substituted bridged bis-indenyl metallocene compounds, when combined with a suitable co-catalyst, are effective under solution polymerization conditions to produce olefin polymers with both high molecular weight and high crystallinity. Surprisingly, propylene based polymers produced using these N-bonded carbazol-9-yl substituted metallocene compounds exhibit significantly higher molecular weight than similar polymers produced using the equivalent N-bonded pyrrol-1-yl and indol-1-yl substituted metallocenes. Also surprising is the higher polymer melting point for propylene polymers produced using these carbazol-9-yl substituted metallocene compounds relative to those produced using the equivalent pyrrol-1-yl and indol-1-yl substituted metallocenes. Also surprising is the lower loss of polypropylene crystallinity when using these carbazol-9-yl substituted metallocene compounds at higher polymerization temperatures relative to the polypropylene produced using the equivalent pyrrol-1-yl and indol-1-yl substituted metallocenes. When combined with a catalyst capable of producing a polymer with a crystallinity of 10% or less, these N-bonded carbazol-9-yl substituted metallocene compounds produce in-reactor blends comprising a component having a crystallinity of 10% or less and a component having a crystallinity of 20% or more, wherein the composition and properties of the individual components are controlled so that the resultant blends, when optionally combined with small quantities of wax, tackifier and/or a functionalized polyolefin, exhibit an excellent balance of adhesive properties, including a good low temperature (such as −18° C. or lower) adhesion performance, short set time and a high strength at relatively low application viscosity.

SUMMARY OF THE INVENTION

This invention relates to a propylene polymer comprising a component having a crystallinity of 10% or less and a component having a crystallinity of 20% or more, said propylene polymer having: a) a melting point of X° C. or more where $X=-0.0038(T_p)^2+0.36(T_p)+150$, where $T_p$ is the temperature of polymerization in ° C.; b) an Mw of 10,000 g/mol or more; c) a heat of fusion of from 1-70 J/g; d) Stereodefects per 10,000 monomer units of Y or less where $Y=2.35(T_p)-100$ (where $T_p$ is the temperature of polymerization in ° C.) for the portion of the blend that is insoluble in hexane at 23° C.; e) a dot T-Peel on Kraft paper of 1 N or more; and f) a branching factor of 0.98 or less, where the branching factor is the ratio of g' of the propylene polymer measured at Mz to g' of the propylene polymer measured at Mw.

This invention also relates to a process to produce such propylene polymers comprising contacting a monomer composition comprising propylene with a polymerization catalyst system (preferably under homogeneous polymerization conditions and at a temperature of about 100° C. to about 195° C.), wherein the polymerization catalyst system includes an activator and two catalyst compounds, where the first catalyst compound is capable of producing a polymer having crystallinity of 10% or less (preferably at said homogeneous polymerization conditions and at a temperature of 100-195° C.), and the second catalyst compound is represented by the formula (A) as described below. Alternately, the first catalyst compound produces a propylene polymer having a heat of fusion of 10 J/g or less.

DEFINITIONS

As used herein, the numbering scheme for the Periodic Table groups is the new notation as set out in CHEMICAL AND ENGINEERING NEWS, 63(5), 27 (1985).

As used herein, Me is methyl, t-Bu and $^tBu$ are tertiary butyl, iPr and $^iPr$ are isopropyl, Cy is cyclohexyl, THF (also referred to as thf) is tetrahydrofuran, and Ph is phenyl.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

For nomenclature purposes, the following numbering scheme is used for an indenyl ring, drawn below as an anionic ligand. Positions 1 and 3 are equivalent, 4 and 7 are equivalent, and 5 and 6 are equivalent.

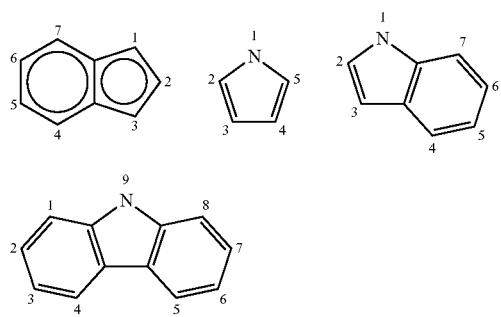

Standard numbering systems are used for heterocyclic substituents. For example, the following numbering of positions is used for pyrrole, indole and carbazole:

The term "catalyst system" means a catalyst precursor/activator pair. When "catalyst system" is used to describe such a pair before activation, it means the unactivated catalyst (pre-catalyst) together with an activator and, optionally, a co-activator. When it is used to describe such a pair after activation, it means the activated catalyst and the activator or other charge-balancing moiety. The transition metal compound may be neutral as in a pre-catalyst, or a charged species with a counter ion as in an activated catalyst system. The term "catalyst-system" can also include more than one catalyst precursor and or more than one activator and optionally a co-activator. Likewise, the term "catalyst-system" can also include more that one activated catalyst and one or more activator or other charge-balancing moiety, and optionally a co-activator.

Catalyst precursor is also often referred to as pre-catalyst, catalyst, catalyst compound, transition metal compound or transition metal complex. These words are used interchangeably. Activator and cocatalyst (or co-catalyst) are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments a co-activator can be pre-mixed with the transition metal compound to form an alkylated transition metal compound.

An activator or cocatalyst is a compound or mixture of compounds capable of activating a pre-catalyst to form an activated catalyst. The activator can be a neutral compound (also called a neutral activator) such as tris-perfluorophenyl boron or tris-perfluorophenyl aluminum, or an ionic compound (also called a discrete ionic activator) such as dimethylanilinium tetrakis-perfluorophenyl borate or triphenylcarbonium tetrakis-perfluoronaphthyl borate. Activators of these types are also commonly referred to as non-coordinating anion activators (NCA activators) owing to the commonly held belief by those skilled in the art, that the reaction of the activator with the pre-catalyst forms a cationic metal complex and an anionic non-coordinating or weekly coordinating anion (NCA). Activators of these types that are discrete characterizable compounds by definition exclude alumoxane co-catalysts which are mixtures. The use of the term NCA is used as an adjective to describe the type of activator as in an NCA activator, or is used as a noun to describe the non-coordinating or weakly coordinating anion which is derived from the NCA activator.

A homogeneous polymerization or a homogeneous polymerization system is a polymerization process where at least 95% of the polymer produced is dissolved in the polymerization medium. Polymer solubility varies with its composition and molecular weight as well as the composition in polymerization medium such as monomer concentration. Other option to run polymerization under homogeneous condition is to adjust the temperature and/or pressure to ensure a one-phase system operation. For purposes of this invention and the claims thereto, the homogeneous polymerization also includes supercritical polymerization processes.

A solution polymerization means a polymerization process in which the polymer produced is dissolved in a liquid polymerization medium, such as an inert solvent or monomer(s) or their blends. A solution polymerization is typically a homogeneous liquid polymerization system.

When a polymer or oligomer is referred to as comprising an olefin, the olefin present in the polymer or oligomer is the polymerized or oligomerized form of the olefin. An oligomer is defined to be compositions having 2-300 monomer units. A polymer is defined to be compositions having more than 300 monomer units.

"Polypropylene" or "propylene polymer" or propylene based polymer" is a polymer having at least 50 wt % propylene units. (Preferably the polypropylene has at least 75 wt % propylene units.)

A higher alpha-olefin is an alpha-olefin having 4-30 carbon atoms.

The term "neat blend" means the polymer material exiting the reactor plus any antioxidants or stabilizers, but no other additives (such as tackifier or processing oil).

Unless otherwise noted, all molecular weight units (e.g., Mw, Mn, Mz) are g/mol. Unless otherwise noted all melting points ($T_m$), including peak melting points ($T_m$), are DSC second melt.

Percent amorphous content is determined by subtracting the percent crystallinity from 100. Percent crystallinity or percent crystalline content is determined using Differential Scanning calorimetry measurement according to ASTM D3418-03 as described in the examples section below.

For ease of reference the polymer produced by the second catalyst having at least 20% crystallinity may also be referred to as the "semi-crystalline polymer" or "crystalline polymer" and the polymer produced by the first catalyst component having a crystallinity of 10% or less may be referred to as the "amorphous polymer."

Hexanes used for all hexane solubility or insolubility tests are a mixture of hexane isomers with a boiling point range of 68-70° C.

By reaction zone is meant an area where the activated catalyst and monomers can react.

DETAILED DESCRIPTION

This invention relates to blends (typically in reactor blends, also called in-situ blends) of propylene polymers comprising a component having a crystallinity of 10% or less and a component having a crystallinity of 20% or more, said blends (typically neat blends) having:
a) a melting point of X° C. or more where $X=-0.0038(Tp)^2+0.36(Tp)+150$, (preferably $X=-0.0038(Tp)^2+0.36(Tp)+152$, preferably $X=-0.0038(Tp)^2+0.36(Tp)+154$), where Tp is the temperature of polymerization in ° C.;
b) an Mw of 10,000 g/mol or more (alternately 25,000 g/mol or more, alternately 40,000 g/mol or more);
c) a heat of fusion of from 1-70 J/g (preferably 1-60 J/g or more, preferably 2-50 J/g or more);
d) Stereodefects per 10,000 monomer units of Y or less where $Y=2.35(Tp)-100$ (where Tp is the temperature of polymerization in ° C.) for the portion of the blend that is insoluble in hexane at 23° C. (preferably $Y=2.35(Tp)-125$, preferably $Y=2.35(Tp)-150$);
e) a dot T-Peel on Kraft paper of 1 N or more (preferably 3N or more, preferably 5N or more, preferably between 1 and 10,000 N); and
f) a branching factor of 0.98 or less, where branching factor is the ratio of g' measured at Mz to g' measured at Mw (preferably 0.98 or less, preferably 0.95 or less, preferably 0.92 or less).

The in-reactor blends produced (also referred to as the propylene polymer, polymer product, olefin polymer blends, blends, or polymer produced) typically comprise a polymer component having a crystallinity of 10% or less (preferably 5% or less, preferably 1% or less) and a polymer component having a crystallinity of 20% or more (preferably 30% or more, preferably 50% or more).

In another embodiment the polymer product of this invention has an amorphous content of at least 30% (based upon the weight of the polymer), alternatively at least 50%, alternatively at least 60%, even alternatively between 30% and 95%.

In another embodiment the polymer blend has a crystallinity of 60% or less, alternatively 50% or less, alternatively 40% or less, even alternatively from 10% and 50%, preferably from 15%-40%.

The melting temperatures of the polymer blends produced typically reflect the degree of crystallinity of the crystalline polymer component in the blend. The polymer blend can have a high melting temperature over a wide range of heats of fusion. In some embodiments, the polymer produced has a melting temperature of 135° C. or higher and a heat of fusion of 70 J/g or less (preferably 1-70 J/g), preferably 145° C. or higher and a heat of fusion of 60 J/g or less (preferably 1-60 J/g), more preferably 150° C. or higher and a heat of fusion of 50 J/g or less (preferably 1-50 J/g). Alternatively, the polymer blend has a melting temperature of 150° C. or higher and a heat of fusion from 5-70 J/g.

In another embodiment, the polymer blends produced herein have a Brookfield Viscosity at 190° C. of at least 500 mPa·sec, preferably at least 1000 mPa·sec, preferably at least 15000 mPa·sec. In another embodiment, the polymer blend has a Brookfield Viscosity at 190° C. of 500-50000 mPa·sec, preferably 800 to 40000 mPa·sec, preferably 1000-20000 mPa·sec.

In another embodiment, the polymer blend produced herein has a heat of fusion of 1-70 J/g, preferably 5-70 J/g, preferably 10-60 J/g, preferably 15-50 J/g.

In another embodiment the polymer blends of this invention have 20 wt % or more, preferably 30 wt % or more (based upon the weight of the starting polymer product) of hexane room temperature soluble fraction, and 70 wt % or less, preferably 50 wt % or less of Soxhlet boiling heptane insolubles, based upon the weight of the starting polymer product. Soxhlet heptane insoluble refers to one of the fractions obtained when a sample is fractionated using successive solvent extraction technique. The fractionations are carried out in two steps: one involves room temperature solvent extraction, the other Soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insolubles and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the polymer blends produced in this invention have a heptane insoluble fraction 70 wt % or less, based upon the weight of the starting polymer, and the heptane insoluble fraction has branching index g' of 0.9 or less (preferably 0.85 or less, preferably 0.80 or less) or less as measured at the Mz of the polymer. In a preferred embodiment the polymer blends produced have at least 20 wt % hexane soluble fraction, based upon the weight of the starting polymer.

In another embodiment, the polymers produced in this invention have a heptane insoluble fraction of 70 wt % or less, based upon the weight of the starting polymer, and an Mz between 20,000 and 500,000 of the heptane insoluble portion. In another embodiment, the heptane insoluble fraction has a peak melting temperature of 150° C. or more, preferably 155° C. or more, or even more preferably 157° C. or more.

In one embodiment, the hexane room temperature soluble fraction has a melting temperature of 30° C. or less, preferably 20° C. or less, and has a heat of fusion of 20 J/g or less, preferably 10 J/g or less, even more preferably 5 J/g or less. In another embodiment, the hexane room temperature soluble fraction is an amorphous material (e.g. has a heat of fusion of 20 J/g or less). In another embodiment, the hexane room temperature soluble fraction has a Shore A hardness of 30 or less, preferably 20 or less. In another embodiment, the heptane insoluble fraction has a Shore A hardness of 70 or more, preferably 80 or more.

The polymer produced herein typically have stereodefects per 10,000 monomer units of Y or less where Y=2.35(Tp)−100 (where Tp is the temperature of polymerization in ° C.) for the portion of the blend that is insoluble in hexane at 23° C. More preferably, the stereodefects per 10,000 monomer units of Y or less where Y=2.35(Tp)−125 for the portion of the blend that is insoluble in hexane at 23° C. Even more preferably, the stereodefects per 10,000 monomer units of Y or less where Y=2.35(Tp)−150 for the portion of the blend that is insoluble in hexane at 23° C.

In another embodiment, any of the polymers produced herein may also have a "total defects/10,000 monomer units" of Z or less where Z=2.70(Tp)−100 (where Tp is the temperature of polymerization in ° C.) for the portion of the blend that is insoluble in hexane at 23° C. More preferably, the "total defects/10,000 monomer units" of Z or less where Z=2.70(Tp)−125 for the portion of the blend that is insoluble in hexane at 23° C. Even more preferably, the "total defects/10,000 monomer units" of Z or less where Z=2.70(Tp)−150 for the portion of the blend that is insoluble in hexane at 23° C.

$^{13}$C NMR spectroscopy is used to determine the "stereodefects per 10,000 monomer units" and the "total defects/10,000 monomer units." The Polymer samples for $^{13}$C NMR spectroscopy are dissolved in $d_2$-1,1,2,2-tetrachloroethane and the samples are recorded at 125° C. using a NMR spectrometer with a $^{13}$C NMR frequency of 100 or 175 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977.

The stereodefects measured as "stereo defects/10,000 monomer units" is calculated from the sum of the intensities of mmrr, mmrm+rrmr, and rmrm resonance peaks times 5000. The intensities used in the calculations are normalized to the total number of monomers in the sample. The intensity from mmrr are corrected for 2,1-insertions; the intensity from mmrm+rrmr are corrected for 1,3-insertions; and n-propyl and n-butyl endgroups, and the intensity from rmrm are corrected for 2,3-dimethylbutyl endgroup at 20.55 ppm. The "total defects/10,000 monomer units" is the sum of the "stereo defects/10,000 monomer units", the "2,1-regio (erythro) defects/10,000 monomer units", the "2,1-regio (threo) defects/10,000 monomer units" and the "1,3-regio defects/10,000 monomer units".

The NMR measurements described for the "stereodefects per 10,000 monomer units" and the "total defects/10,000 monomer units" above are measured on the portion of the polymer blend that is insoluble in hexane at 23° C.

In another embodiment the polymer blend produced by this invention has a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, and the presence or absence of chain transfer agent such as hydrogen. Chain transfer agents and or hydrogen may be used at amounts up to 2 wt %, but is preferably used at levels of 50-500 ppm of the reaction medium.

In another embodiment the blends produced herein may have a unimodal, bimodal, or multimodal molecular weight distribution (Mw/Mn) distribution of polymer species as determined by Size Exclusion Chromatography (SEC). By bimodal is meant that the SEC trace has two peaks or inflection points. By multimodal is meant that the SEC trace has more than two peaks or inflection points. An inflection point is that point where the second derivative of the curve changes in sign (e.g., from negative to positive or vice versus). Molecular weight distribution can be adjusted through selection of catalysts.

In another embodiment the polymer produced has an Mw of 10,000-500,000 g/mol, preferably 10,000-100,000 g/mol, preferably 20,000-80,000 g/mol.

In another embodiment the polymer blends produced are found to have at least two molecular weight fractions present at greater than 2 wt %, preferably greater than 10 wt %, preferably greater than 20 wt % each based upon the weight of the polymer product as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 wt % of the polymer and the area under the second peak represents more than 2 wt % of the polymer.

In another embodiment, the propylene polymer produced has a melting point of X° C. or more, where X=−0.0038(Tp)$^2$+0.36(Tp)+150, preferably X=−0.0038(Tp)$^2$+0.36(Tp)+152, preferably X=−0.0038(Tp)$^2$+0.36(Tp)+154, preferably X=−0.0038(Tp)$^2$+0.36(Tp)+156 where Tp is the temperature of polymerization in ° C. In the event the blend has more than one DSC melting point, then the highest melting point (second melt) is used for X.

In another embodiment the glass transition temperature (Tg) of the polymer blend is 2° C. or less, alternately 0° C. or less, alternately −5° C. or less, alternatively between 0° C. and −40° C., alternatively between −5° C. and −15° C. Tg is determined according to the DSC procedure described in the examples section below.

In another embodiment the Shore A hardness of the polymer blend is 95 or less (Shore A hardness is determined by ASTM D2240 (Condition A, 15 second delay using an air cooled dot of adhesive that is subjected to the needle and the deflection is recorded from the scale), alternately 90 or less, alternately 80 or less, alternately 70 or less.

It is to be appreciated that in a system with multiple catalysts, a polymer chain with reactive terminal groups derived from one catalyst can be incorporated into another polymer chain derived from another catalyst to form a branched product. It is believed that the higher the concentration of vinyl terminated macromonomers the higher the probability of getting them incorporated, and therefore the higher the branch population. Level of branching can be measured by a branching factor. The branching factor is defined as a ratio of g' measured at Mz to g' measured at Mw. In one embodiment, the polymer blend produced has a branching factor of 0.98 or less, preferably 0.95 or less, more preferably 0.92 or less. Branching factor is measured on the blends produced herein.

In another embodiment the blends produced herein may have g'$_{avg}$ of 0.98 or less, preferably 0.95 or less, preferably 0.90 or less. ("avg" is the average of g's for Mw, Mn and Mz as described in the Testing section below).

In another embodiment the blend described herein also has a Dot T-Peel of between 1 Newton and 10,000 Newtons, or 3 and 4000 Newtons, or between 5 and 3000 Newtons, or between 10 and 2000 Newtons, or between 15 and 1000 Newtons. Dot T-Peel is determined according to ASTM D 1876, except that the specimen is produced by combining two 1 inch by 3 inch (2.54 cm×7.62 cm) Kraft paper substrate cut outs with a dot of adhesive with a volume that, when compressed under a 500 gram weight occupies about 1 square inch of area (1 inch=2.54 cm). Once made all the specimens are pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

In another embodiment the blend described above has a set time of several days to 1 second, or 60 seconds or less, or 30 seconds or less, or 20 seconds or less, or 15 seconds or less, or 10 seconds or less, or 5 seconds or less, or 4 seconds or less, or 3 seconds or less, more or 2 seconds or less, or 1 second or less.

In another embodiment, the blends described herein have a shear adhesion fail temperature (SAFT) of 40-150° C., or 60-130° C., or 65-110° C., or 70-80° C. SAFT (modified ASTM D4498) measures the ability of a bond to withstand an elevated temperature rising at 10° F. (5.5° C.)/15 min, under a constant force that pulls the bond in the shear mode. Bonds were formed in the manner described above for Dot T-Peel (1 inch by 3 inch (2.5 cm×7.6 cm) on Kraft paper. The test specimens were suspended vertically in an oven at room temperature with a 500 gram load attached to the bottom. The temperatures at which the weight fell was recorded (when the occasional sample reached temperatures above the oven capacity>265° F. (129° C.) it was terminated and averaged in with the other samples at termination temperature).

Any of the polymers produced herein may have a Melt Flow Rate (MFR) as determined by ASTM 1238 (230° C., 2.16 kg) of 5 dg/min or more, alternately 10 dg/min or more, alternately 20 dg/min or more.

Process

This invention also relates to a process for producing a propylene polymer (homopolymer or copolymer) blends, the process comprising:

1) contacting a monomer composition comprising propylene with a polymerization catalyst system under homogeneous polymerization conditions and at a temperature of 100° C. or more, preferably 110° C. to about 195° C., wherein the polymerization catalyst system includes an activator and two catalyst compounds, where the first catalyst compound is capable of producing a polymer having a crystallinity of 10% or less (alternately a heat of fusion of 20 J/g or less) at said homogeneous polymerization conditions (typically a compound represented by Formula 1, 2 or 3 as described below) and at a temperature of at least 100° C. (preferably at least 110° C.)-195° C., and the second catalyst compound is represented by the formula A:

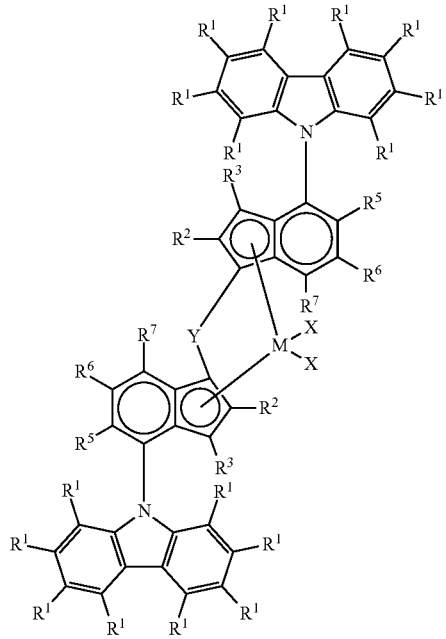

wherein
M is a transition metal selected from group 4 of the Periodic Table of the Elements (preferably Ti, Hf or Zr);
each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;
each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;
Y is a bridging group (preferably a group 14 bridging group, preferably represented by the formula QR*$_2$, where Q is Si, C, or HC—CH and each R* is, independently, a hydrocarbyl, substituted hydrocarbyl, halocarbyl, substituted halocarbyl, silylcarbyl, substituted silylcarbyl, germylcarbyl, or substituted germylcarbyl substituent); and
each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand; and 2) obtaining a blend of propylene polymers comprising a component having a crystallinity of 10% or less and a component having a crystallinity of 20% or more, said blend having:
a) a melting point of X° C. or more where X=−0.0038(Tp)$^2$+0.36(Tp)+150, where Tp is the temperature of polymerization in ° C.;
b) having an Mw of 10,000 g/mol or more;
c) a heat of fusion of from 1-70 J/g;

d) Stereodefects per 10,000 monomer units of Y or less where Y=2.35(Tp)−100 (where Tp is the temperature of polymerization in °C.) for the portion of the blend that is insoluble in hexane at 23° C.;
e) a dot T-Peel on kraft paper of 1 N or more; and
f) a branching factor of 0.98 or less, where branching factor is the ratio of g' measured at Mz to g' measured at Mw.

In an alternate embodiment the blend obtained from the process is any of the blends described above.

In an alternate embodiment, the first catalyst component is capable of producing a polymer having a heat of fusion of 10 J/g or less.

In an alternate embodiment, the first catalyst component is capable of producing a polymer having a heat of fusion of 10 J/g or less and/or is capable of polymerizing macromonomers having reactive termini; and the second catalyst component is capable of producing macromonomers having reactive termini, and a crystallinity of 20% or more.

By macromonomers having reactive termini is meant a polymer or oligomer having 70 carbon atoms or more and having a vinyl, vinylidene, vinylene or other terminal group that can be polymerized into a growing polymer chain (amount and kind of reactive termini are determined by $^1$H NMR or $^{13}$C NMR, provided that in the event of conflict $^1$H NMR shall control). By capable of polymerizing macromonomer having reactive termini is meant a catalyst component that can incorporate a macromonomer, having reactive termini into a growing polymer chain. By capable of producing macromonomers having reactive termini is meant that the catalyst compound produces macromonomer having at least 90% vinyl, vinylidene, vinylene or other terminal group that can be polymerized into a growing polymer chain. Preferably the reactive termini is at least 50%, preferably at least 75%, preferably at least 80% vinyl (based upon the total number of end group unsaturation).

In an alternate embodiment, the first catalyst component is capable of producing a polymer having an Mw of 500,000 or less and a crystallinity of 10% or less (or a heat of fusion of 10 J/g or less) and is capable of polymerizing macromonomers having reactive termini; and the second catalyst component is capable of producing macromonomers having reactive termini, an Mw of 500,000 or less and a crystallinity of 20% or more (or a heat of fusion of 38 J/g or more).

In another preferred embodiment this invention relates to a continuous process to produce a polymer blend composition comprising:
1) selecting a first catalyst component (represented by Formula 1, 2 or 3 below) capable of producing a polymer having an Mw of 500,000 or less, preferably 200,000 or less, preferably 100,000 or less and a crystallinity of 10% or less, preferably 5% or less, more preferably 3% or less, under the selected polymerization conditions;
2) selecting a second catalyst component represented by Formula A capable of producing polymer having an Mw of 500,000 or less, preferably 200,000 or less, preferably 100,000 or less and a crystallinity of 20% or more, preferably 30% or more, more preferably 40% or more at the same selected polymerization conditions;
3) contacting, under the selected polymerization conditions, the catalyst components in the presence of one or more activators with one or more $C_3$-$C_{40}$ olefins, preferably one or more $C_3$-$C_{12}$ olefins, preferably $C_3$ and one or more of ethylene and/or $C_4$-$C_{20}$ comonomers, and, optionally one or more diolefins, preferably a $C_4$-$C_{20}$ diene;
4) at a temperature of greater than 100° C., preferably greater than 110° C., preferably greater than 115° C., more preferably greater than 120° C., more preferably between 125° C. and 195° C.;
5) at a residence time of 120 minutes or less, preferably 90 minutes or less, preferably 60 minutes or less, preferably 40 minutes, preferably 30 minutes or less, preferably 25 minutes or less, more preferably 20 minutes or less, more preferably 15 minutes or less; alternately the residence time may be between 40 and 120 minutes;
6) wherein the molar ratio of the first catalyst to the second catalyst is from 1:1 to 100:1, preferably 1:1 to 50:1, more preferably 1:1 to 1:20;
7) wherein the activity of the catalyst components is at least 3 kilograms, preferably at least 10 kilograms, more preferably at least 20 kilograms, more preferably at least 50 kilograms, more preferably, 100 kilograms of polymer per gram of the catalyst mixture; and wherein at least 50%, preferably at least 70%, more preferably at least 90%, more preferably at least 95% of the olefins are converted to polymer product having an Mw of 5,000 g/mol or more;
8) obtaining an blend of propylene polymers (such as the polymers described above), said polymers typically comprising a component having a crystallinity of 10% or less and a component having a crystallinity of 20% or more, said blend having:
  a) a melting point of X° C. or more where X=−0.0038(Tp)$^2$+0.36(Tp)+150, where Tp is the temperature of polymerization in ° C.;
  b) having an Mw of 10,000 g/mol or more;
  c) a heat of fusion of from 1-70 J/g;
  d) Stereodefects per 10,000 monomer units of Y or less where Y=2.35(Tp)−100 (where Tp is the temperature of polymerization in °C.) for the portion of the blend that is insoluble in hexane at 23° C.;
  e) a dot T-Peel on Kraft paper of 1 N or more;
  f) a branching factor of 0.98 or less, where the branching factor is the ratio of g' a the Mz to g' at the Mw; and
9) optionally, pelletizing the blend.

In another embodiment the process comprises: 1) contacting, in a solvent, the catalyst components in the presence of one or more activators with one or more $C_3$-$C_{40}$ olefins, and, optionally one or more diolefins; 2) wherein the ratio of the first catalyst to the second catalyst is from 1:1 to 50:1; 3) withdrawing polymer solution from the reaction zone; 4) removing at least 10% solvent from the polymer solution; 5) devolatilizing the polymer solution to form molten polymer; 6) optionally combining the molten polymer and one or more additives in a static mixer 7) optionally, pelletizing the blend.

In a preferred embodiment the process described above takes place in a solution polymerization process. In another embodiment the process described above does not take place in a supercritical polymerization process.

The ratio of the first polymer to the second polymer can be controlled by varying the ratio of the first catalyst to the second catalyst in this process. Increasing the amount of the first catalyst increases the amount of amorphous polymer produced. Changes in the ratio of the first polymer to the second polymer in the reactor blend is also reflected in the change of heat fusion and crystallinity of the final in-reactor blend.

Likewise, melting and crystallization characteristics can be controlled through catalyst selection, comonomer addition and changes in process conditions such as temperature and catalyst ratio. Catalysts capable of producing high crystalline polymer can produce a polymer blend with higher melting point (Tm) and crystallization temperature (Tc). For some catalysts, the catalyst behaves differently when mixed with other catalysts in the same polymerization reactor than that if the catalyst is used alone. This behavior of catalyst interaction provides another means to control properties of the polymer blends. Catalyst selection is another mean to adjust properties of the in-reactor blend due to the different catalyst responses to the polymerization environment.

In another preferred embodiment a third catalyst (or more) may be present in the processes described herein. The third catalyst may be any of the catalyst components listed herein or other catalyst components as described in U.S. Pat. No. 7,294,681. Preferred third catalysts include catalysts that are capable of producing waxes (preferred waxes are oligomers or polymers having an Mn of 20,000 g/mol or less). A third catalyst can be also used to manipulate molecular weight distribution (such as tri-modal distribution) based on the end-use requirement. For example, a third catalyst can be selected to produce high molecular weight polymer in the same reaction environment to enhance the mechanical property of the blend without sacrificing the flow property for a polymer blend with low molecular weight. Likewise, a low molecular weight polymer component can be produced by using a third catalyst to improve the flow property of a polymer blend with high molecular weight.

Useful reaction process conditions to produce polypropylene macromonomers having high levels of terminal vinyl unsaturation are described in U.S. Pat. No. 6,117,962. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,296,434, U.S. Pat. No. 5,278,264, U.S. Pat. No. 5,304,614, U.S. Pat. No. 5,510,502, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al., Organometallics 1994, 13, 954-963, and "ansa-Zirconocene Polymerization Catalysts with Annelated Ring Ligands-Effects on Catalytic Activity and Polymer Chain Lengths", Brinzinger, H., et al, Organometallics 1994, 13, 964-970, and documents referred to therein. Cocatalyst/activator also plays important role in increasing vinyl terminated macromonomers.

Branched structures can also form through crosslink chemistry in this invented process. Crosslink typically refers to the connection of two polymer segments by incorporation of one double bond of a diolefin monomer into a polymer segments and another double bond into another polymer segment. The polymer segments so connected can be the same or different, with respect to their composition/crystallinity.

Optionally the polymer blends are copolymers of one or more alpha-olefins and one or more of monomers having at least two olefinically unsaturated bonds. Both of these unsaturated bonds are suitable for and readily incorporated into a growing polymer chain using either the first or second catalyst systems independently such that one double bond is incorporated into a polymer segments while another double bond is incorporated into another polymer segments to form a branched copolymer. In a preferred embodiment these monomers having at least two olefinically unsaturated bonds are di-olefins, preferably di-vinyl monomers.

Three or more polymer segments may also be connected via incorporation of two or more diolefins into other polymer segments. In some embodiments it is further desired that the level of incorporation of the diolefin monomer into the crystalline segments be limited to an amount that will not substantially alter its crystallinity. Alternatively, the diolefin coupling agent is typically kept to a minimum to insure the overall composition is gel-free. For some adhesive applications, level of diolefin incorporation is limited so the in-reactor blend has a viscosity of 15,000 mPa·sec or less at 190° C. (as determined by a Brookfield viscometer). In alternate embodiments, less than 0.1 wt % diene is present in the blend, preferably 0 wt % diene is present in the blend.

It is believed that the fraction of branched structures and the level of branching depend on the availability of polymerizable macromonomers with unsaturated chain end and macromonomer incorporation capability of the specific catalyst. To increase the population of branched composition, one typically operates within a process window that favors macromonomer production and insertion. Favorable conditions include:

1) High concentration of catalyst producing the semi-crystalline vinyl terminated macromonomers, and or Optimizing the Al/metal ratio, proper selection of catalyst and cocatalyst pair; and/or
1) High polymerization operating temperature; and/or
2) Catalyst structure that has a high affinity for macromonomer incorporation; and/or
3) Relatively long residence time; and/or
4) High monomer conversion (monomer starvation condition enhances the insertion of macromonomer); and/or
5) Addition of modifier (e.g., diolefin) to enhance the population of vinyl terminated macromonomers.

Another method of enhancing branched compositions is to add in a chain transfer agent that transfers a vinyl group to the end of the polymer chain while deactivating the catalyst. Such chain transfer agents include, but are not limited to, vinyl chloride, vinyl fluoride, vinyl bromide. In the process, the catalyst is reactivated by the presence of an aluminum alkyl activator such as an alumoxane (typically methylalumoxane).

In another embodiment diethyl zinc is present in the reaction.

In a particular embodiment the present invention is directed to a process to produce polyolefin polymer by copolymerizing one or more $C_3$ or higher alpha-olefins and/or one or more divinyl monomers, and optionally up to 5 mol % ethylene, in the presence of at least one N-bonded carbazol-9-yl substituted bridged bis-inden-1-yl (e.g. Formula A) metallocene catalyst system and at least one other catalyst system in the same polymerization medium. Preferably, the polymerizations are carried out simultaneously in the presence of both catalysts. The polymer so produced contains amorphous polymer segments and crystalline polymer segments in which at least some of the segments are linked to form branched structures.

In another embodiment, polyolefin branched compositions containing amorphous and semi-crystalline components may be prepared in a single reactor to yield desired property balance. In one embodiment one N-bonded carbazol-9-yl substituted bridged bis-inden-1-yl metallocene compounds can be selected to produce semi-crystalline PP macromonomers (scPP). A bridged mono-cyclopentadienyl heteroatom group 4 catalyst can be used to build amorphous PP (aPP) while simultaneously incorporating some of the semi-crystalline macromonomers into the aPP chains. This is believed to produce an aPP-g-scPP structure where the "-g-" indicates that the polymer types are at least partially grafted. By selecting the catalysts, the polymerization reaction conditions, and/or by introducing a diene modifier, the amorphous and crystalline components can be linked together to produce various branched structures.

In a preferred embodiment the process described above takes place in a solution polymerization process. In another embodiment, both the first and second catalysts are fed into the same reactor, and polymerization takes place in a single reactor system. In a single polymerization reactor system, the property of polymer blends can be manipulated through catalyst choice, the catalyst ratio and other process variables.

In another embodiment, the in-reactor blend is produced in multiple reactors in series configuration. In this process, the first polymer component having a crystallinity of 10% or less is produced in a first reaction zone in the presence of a first catalyst system and then contacting the first polymer product, optionally with additional propylene or other comonomer, in a second reaction zone in the presence of a second catalyst system, wherein the second component is produced. In some embodiments, propylene and optionally at least one of $C_2$ olefin or $C_4$-$C_{20}$ alpha-olefin is introduced, at different amount, into both of the first and the second reaction zones. By controlling the amounts of propylene and $C_2$ olefin or $C_4$-$C_{20}$ alpha-olefin fed to each reaction zone, it is possible to produce an in-reactor blend in which the various components have different molecular structures such that the overall composition exhibits the desired combination of adhesive properties.

When the amorphous component is produced in the first reaction zone wherein at least one of $C_2$ olefin or $C_4$-$C_{20}$ alpha-olefin is presence in the first reaction zone, conversion of the comonomer in the first reaction zone is controlled to be above 90%, preferably above 95%, so that propylene copolymer with high melting temperature can be produced in the second reaction zone. The preferred melting temperature of the polymer produced in the second reaction zone is greater than 100° C., more preferably greater than 120° C.

In yet another embodiment, the in-reactor blend is produced in multiple reactors in series configuration. In this process, the second polymer component having a crystallinity of 20% or more is produced in a first reaction zone in the presence of a second catalyst system and then contacting the second polymer component, optionally with additional propylene or other comonomer, in a second reaction zone in the presence of a first catalyst system, wherein the amorphous polymeric component is produced. In some embodiments, propylene and optionally at least one of $C_2$ olefin or $C_4$-$C_{20}$ alpha-olefin is introduced, at different amount, into both of the first and the second reaction zones.

The in-reactor blend can be also produced by contacting propylene alone in a first reaction zone with a first catalyst capable of producing a amorphous polypropylene having a crystallinity of 10% or less, and in a second reaction zone with a second catalyst capable of producing a crystalline polypropylene with a crystallinity of 20% or more. In one embodiment, all propylene is fed into the first reaction zone. Alternatively propylene feed is split between the first and the second reaction zones. In another embodiment, the in-reactor blend can be also produced by contacting propylene alone in a first reaction zone with a second catalyst capable of producing a crystalline polypropylene having a crystallinity of 20% or more. The effluent of the first reactor is then transferred into the second reactor wherein the amorphous polypropylene is produced in the presence of a first catalyst.

Reaction temperatures for each reactor in the multiple reactor polymerization process can be controlled independently, depending on the requirement of the in-reactor blend for certain applications. Polymer with broad molecular weight distribution or multiple modal distribution can be produced through catalyst selection and/or reaction temperature in each reaction zone.

In a process using multiple polymerization zones, polymer chains with reactive terminal groups produced in a first polymerization zone can flow over into a subsequent polymerization zone wherein the reactive polymer chains can be incorporated into growing polymer chains to form branched cross-products. The branched cross-products are also referred to as branched polymers.

This inventive process can be used for any known polymerization method used to produce the in-reactor blend of present propylene copolymer. Polymerization methods include solution, slurry, gas, bulk phase, suspension, high pressure, super-critical phase, or a combination thereof, using a single-site metallocene catalyst system, preferably solution polymerization process. The catalysts can be in the form of a homogeneous solution, supported, or a combination thereof. Polymerization may be carried out by a continuous, a semi-continuous or batch process and may include use of chain transfer agents (such as diethyl zinc, hydrogen aluminum alkyls, and the like), scavengers, or other such additives as deemed applicable. By continuous process is meant that there is continuous addition to, and withdrawal of reactants and products from, the reactor system. Continuous processes can be operated in steady state; i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn.

Solvents may be used in the homogeneous polymerizations described herein. Suitable solvents are generally aliphatic and aromatic hydrocarbons, with alkanes, such as pentane, iso-pentane, hexane, isohexane and octane, being preferred. Solution polymerization can be carried out in a continuous stirred tank reactor, batch reactor, or plug flow reactor, or more than one reactor operated in series or parallel. These reactors may have or may not have internal cooling and the monomer feed may or may not be refrigerated. See the general disclosure of U.S. Pat. No. 5,001,205 for general process conditions. See also WO 96/33227 and WO 97/22639. Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the targeted product properties and catalyst used. In general, the reactor temperature preferably can vary between about 100° C. and about 195° C., such as from greater than 110° C. to about 180° C., for example from about 115° C. to about 160° C. In series operation, the second reactor temperature is preferably higher than the first reactor temperature. In parallel reactor operation, the temperatures of the two reactors are independent. The pressure can vary from about 0.01-250 MPa, preferably from 0.01-160 MPa, most preferably from 0.1-50 MPa.

Use of the N-bonded carbazol-9-yl substituted bridged bis-inden-1-yl metallocene catalyst system allows high molecular weight polymer with high polymer crystallinity to be produced at higher than usual reactor temperatures. To produce polymers with similar molecular weight and/or crystallinity, the polymerization can takes place at higher reaction temperature when using the N-bonded carbazol-9-yl substituted bridged bis-inden-1-yl metallocene catalyst system. Higher reaction temperature allows for better energy utilization. Higher polymerization temperature also provides a means to increase the polymer loading in the polymerization medium without increase the viscosity of the reaction medium in a solution process. In one embodiment, the polymer loading is 15 wt % or more, preferably 20 wt % or more, more preferably 30 wt % or more, even more preferably 40 wt % or more, based on the total weight of the polymerization medium including solvent, monomers and polymer produced.

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Monomer concentration may be varied in the wide range in a solution process. For most catalysts, high monomer concentration implies high productivity and high molecular weight of polymer produced. Changing composition of the polymerization medium will also change the polymer solubility to the reaction medium. The polymerization temperature and/or pressure need to change accordingly to the composition change caused by high monomer concentration to ensure a homogeneous phase polymerization. It is also desirable to have a good balance between polymer concentration, viscosity of the polymerization medium and energy consumption. Preferably, the monomer concentration is 5 wt % or more, more preferably 10 wt % or more, even more preferably 15 wt % or more, even more preferably 20 wt % or more, even more preferably 30 wt % or more, based on the total weight of the polymerization medium including solvent, monomers and polymer produced.

The polymer produced in this invented process can be recovered from the effluent of either the first polymerization step or the second polymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

In another embodiment, the blends produced herein or the adhesives comprising the blends produced herein may be pelletized. The present invention is preferably able to be pelletized into a plurality of free flowing particles. As used herein, the term pellet may be interchangeably referred to as granules, particles, and the like, all of which are directed to discrete entities of the inventive composition. Preferably, pellets and/or particles of the blends or adhesives of the present invention may be regarded as a pourable free-flowing polymer composition. As such, the particles of the present invention are not tacky or sticky, and thus do not block, which is to say the pellets do not stick to one another nor to other surfaces so as to form agglomerates comprising a plurality of pellets to an extent which prevents the pellets from being pourable. By "pourable free-flowing" it is meant that a 500 gram sample of the particles will flow through a funnel and yield a pourability value of 120 seconds or less according to ASTM D1895 Method B modified to use a funnel having a 29 mm bottom, preferably both initially and after elevated temperature storage (e.g., storage at 120° F. for 7 days). Accordingly, the particles of the present invention are pourable free-flowing particles in that they may be poured through a funnel having a 2.9 cm opening at the narrow end in 120 seconds or less.

An initial pourability value (i.e., prior to aging or storage) of the particles of the present invention is typically about 120 seconds or less, when determined according to ASTM D1895 Method B modified to use a funnel having a 29 mm bottom opening. Preferably, the pourability value is about 60 seconds or less, more preferably about 30 seconds or less, still more preferably about 10 seconds or less, more preferably about 5 seconds or less, still more preferably about 2 seconds or less.

After aging of the particles at 120° F. for 7 days, the aged pourability value of the particles (for a 500 gram sample) of the present invention is typically about 300 seconds or less, when determined according to ASTM D1895 Method B modified to use a funnel having a 29 mm bottom opening, preferably about 200 seconds or less, more preferably about 100 seconds or less, still more preferably about 50 seconds or less, more preferably about 30 seconds or less, still more preferably about 10 seconds or less. Preferred pellets can be from 0.5-20 mm, alternately 1 mm-10 mm.

In a preferred embodiment, the compositions described herein are formed into particles, granules or pellets and those particles, granules or pellets are dusted with a polyolefin powder, preferably a microfine polyolefin powder. Preferably the powder is used at 0.01-10 wt % (preferably 0.1-5 wt %, preferably 0.1-1 wt %) based upon the weight the composition. Preferred polyolefin powders are typically polyethylene (including low density PE, linear-low density PE, medium density PE, and high density PE), polypropylene, or ethylene vinyl acetate copolymers. A preferred polyolefin powder is made from polyethylene with a density 0.91-0.96 g/cc (preferably 0.915-0.925 g/cc) and an melt index of 1-100 dg/min (preferably 5-50 dg/min, ASTM 1238 at 190° C., 2.16 kg). The polyolefin powders may have a mesh size of from 1-100 (preferably 5-100, preferably 10-70) and a median diameter of 5-2000 micron (preferably 10-500 micron, preferably 10-100 micron, preferably 15-25 micron). Useful polyolefin powders are available from Equistar Chemical (part of Lyondell Chemical) under the tradename Microthene™, including Microthene™ F grades and Microthene™ G grades such as Microthene™ FN510, Microthene™ FN532, Microthene™ FA700, and Microthene™ FP-800. A particularly preferred microfine powder is Microthene™ FA709-00, which is a high density polyethylene powder (0.952 g/cc) having a reported melt index of 10 dg/min, a reported melting point of 134° C., and an average particle size of 20 microns.

The First Catalyst

Any catalyst precursor compound that can produce the desired polymer species (i.e. a polymer crystallinity of 10% or less, preferably 5% or less and preferably having an Mw of 500,000 or less) may be used as the first catalyst in the practice of this invention. Pre-catalyst compounds which may be utilized as the first catalyst in the process of the invention include metallocene transition metal compounds (containing one, two, or three cyclopentadienyl-type ligands per metal atom), non-metallocene early transition metal compounds (including those with amide and/or phenoxide type ligands), non-metallocene late transition metal compounds (including those with diimine or diiminepyridyl ligands), and other transition metal compounds.

The first catalyst typically comprises those compounds capable of polymerizing a $C_2$-$C_{20}$ olefin to produce a polymer having a crystallinity of 10% or less (amorphous polymer) under selected polymerization conditions. A preferred choice of transition metal compounds for producing the amorphous polymer fraction are mono-cyclopentadienyl transition metal compounds (pre-catalysts) of the formula (1):

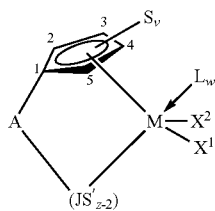

Formula (1)

wherein M is a group 3, 4, 5 or 6 transition metal atom, or a lanthanide metal atom, or actinide metal atom, preferably a group 4 transition metal atom selected from titanium, zirconium or hafnium; the cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$-$C_{20}$ ring to give a saturated or unsaturated polycyclic ligand (such as an indene or a fluorene), where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); $(JS'_{z-2})$ is a heteroatom ligand in which J is an element from group 15 of the Periodic Table of Elements with a coordination number of 3 or an element from group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J; A is a bridging group; and $X^1$ and $X^2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X^1$ and $X^2$ are joined and bound to the metal atom to form a metallacycle ring containing from about 3 to about 20 carbon atoms; or $X^1$ and $X^2$ together can be an olefin, diolefin or aryne ligand; or when Lewis-acid activators, such as methylalumoxane, which are capable of donating an $X^1$ ligand as described above to the transition metal component are used, $X^1$ and $X^2$ may independently be a halogen, alkoxide, aryloxide, amide, phosphide or other univalent anionic ligand or both $X^1$ and $X^2$ can also be joined to form a anionic chelating ligand and with the proviso that $X^1$ and $X^2$ are not a substituted or unsubstituted cyclopentadienyl ring; L is an olefin, diolefin, aryne, amine, phosphine, ether, or sulfide ligand, or any other neutral Lewis base, and w is 0, 1, 2 or 3.

Conveniently, A is a bridging group containing boron or a group 14, 15 or 16 element. Examples of suitable bridging groups include R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'P, O, S, Se, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group A include $CH_2$, $CH_2CH_2$, $CH(CH_3)_2$, O, S, $SiMe_2$, $SiPh_2$, SiMePh, $Si(CH_2)_3$ and $Si(CH_2)_4$.

"Symmetrically substituted" in relation to the S ligands in formula (1) is defined to mean that the cyclopentadienyl ring is substituted in the 2 and 5 positions and/or 3 and 4 positions with $S_v$ groups that are of approximately of the same steric bulk. Typically the size of these $S_v$ groups is within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs is of similar steric bulk. Additionally, two adjacent $S_v$ groups in the 3 and 4 position may be linked to form a ring provided that the new ring is also symmetrically substituted.

Catalyst systems including transition metal compounds of the type defined by formula (1) are known to impart 2,1-mistakes when incorporating $C_3$ and higher alpha-olefins. The compounds where S' is bonded to a nitrogen ligand (J) via a tertiary carbon (for example when S' is tert-butyl or 1-adamantyl) have fewer 2,1-mistakes then when S' is bonded to the nitrogen ligand (J) via a primary carbon (for example when S' is n-butyl, methyl, or benzyl) or secondary carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560, which is incorporated herein by reference. Lower Mw versions of such polymers can be produced by changing process condition, for example, by increasing reactor temperature.

Illustrative, but not limiting examples of preferred mono-cyclopentadienyl metallocenes of the type described in formula (1) above are:

μ-$(CH_3)_2$Si(cyclopentadienyl)(1-adamantylamido)M($X^1$)($X^2$)

μ-$(CH_3)_2$Si(3-tertbutylcyclopentadienyl)(1-adamantylamido)M($X^1$)($X^2$)

μ-$(CH_3)_2$Si(tetramethylcyclopentadienyl)(1-adamantylamido)M($X^1$)($X^2$)

μ-$(CH_3)_2$C(tetramethylcyclopentadienyl)(1-adamantylamido)M($X^1$)($X^2$)

μ-$(CH_3)_2$Si(tetramethylcyclopentadienyl)(1-tertbutylamido)M($X^1$)($X^2$)

μ-$(CH_3)_2$Si(fluorenyl)(1-tertbutylamido)M($X^1$)($X^2$)

μ-$(CH_3)_2$Si(tetramethylcyclopentadienyl)(1-cyclododecylamido)M($X^1$)($X^2$)

μ-$(CH_3)_2$C(tetramethylcyclopentadienyl)(1-cyclododecylamido)M($X^1$)($X^2$)

wherein M is selected from a group consisting of Ti, Zr, and Hf and wherein $X^1$ and $X^2$ are as described above, and are preferably independently selected from F, Cl, Br, $CH_2Ph$ and $CH_3$. In a preferred embodiment $X^1$ and $X^2$ are the same.

Additionally, at higher reaction temperatures, some catalysts that produce syndiotactic poly-alpha-olefin at lower temperatures will produce virtually non-crystalline poly-alpha-olefins at higher temperatures. Preferred transition metal compounds (pre-catalysts) of this type are illustrated in formula (2):

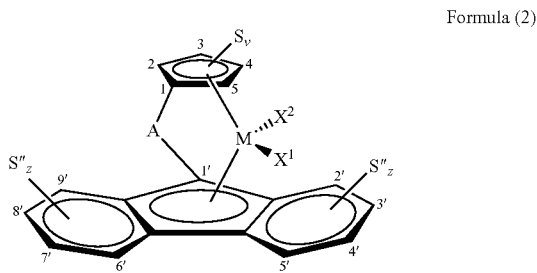

Formula (2)

wherein M is a group 3, 4, 5 or 6 transition metal atom, or a lanthanide metal atom, or actinide metal atom, preferably a group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$-$C_{20}$ ring to give a saturated or unsaturated polycyclic ligand; subscript "z" denotes the carbon atom on the fluorenyl ring to which the substituent is bonded and where there can be zero to seven substituents, S", on the fluorenyl ring; A is a bridging group as defined above in Formula (1), and $X^1$ and $X^2$ are as defined in Formula (1); "Symmetrically substituted" in relation to the $S_v$ ligands in formula (2) is defined to mean that the cyclopentadienyl ring is substituted in the 2 and 5 positions and/or 3 and 4 positions with $S_v$ groups that are of approximately of the same steric bulk. Typically the sizes of these $S_v$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs are of similar steric bulk. Additionally, two adjacent $S_v$ groups in the 3 and 4 position may be linked to form a ring provided that the new ring is also symmetrically substituted.

Preferably metallocene precursors for producing poly-alpha-olefins having largely amorphous character (when used as catalysts under higher reactor temperature conditions) are those of formula (2) where $S_v$ are independently chosen such that the metallocene framework has a plane of symmetry containing the metal center and bisecting the Flu- and Cp- rings. The A ligand need not be symmetrical—for example dimethylsilyl or methylphenylsilyl will not effect the stereochemistry of the polymer produced. Because of the distant placement of the S" substituents on the fluorenyl ring, these substituents need not be symmetrically placed on the fluorenyl ring. Hence, the fluorenyl ring may be substituted with up to 7 substituents that may be the same or different.

Illustrative, but not limiting examples of preferred unsymmetrical cyclopentadienyl metallocenes of the type described in formula (2) above for the invention are:

μ-$(C_6H_5)_2$C(cyclopentadienyl)(fluorenyl)M($X^1$)($X^2$)

μ-$(C_6H_5)_2$C(3-methylcyclopentadienyl)(fluorenyl)M($X^1$)($X^2$)

μ-$(CH_3)_2$C(cyclopentadienyl)(fluorenyl)M($X^1$)($X^2$)

μ-$(C_6H_5)_2$C(cyclopentadienyl)(2-methylindenyl)M($X^1$)($X^2$)

μ-$(C_6H_5)_2$C(3-methylcyclopentadienyl)(2-methylindenyl)M($X^1$)($X^2$)

μ-(p-triethylsilylphenyl)$_2$C(cyclopentadienyl)(3,8-di-t-butylfluorenyl)M($X^1$)($X^2$)

μ-$(C_6H_5)_2$C(cyclopentadienyl)(2,7-dimethylindenyl)M($X^1$)($X^2$)

μ-$(CH_3)_2$C(cyclopentadienyl)(2,7-dimethylindenyl)M($X^1$)($X^2$).

wherein M is chosen from the group consisting of Zr and Hf and wherein $X^1$ and $X^2$ as described above in Formula (I), and are preferably independently selected from F, Cl, Br, $CH_2Ph$ and $CH_3$. In a preferred embodiment $X^1$ and $X^2$ are the same. Additionally, compounds (pre-catalysts) of formula (3) may be used to produce the amorphous polymer fraction.

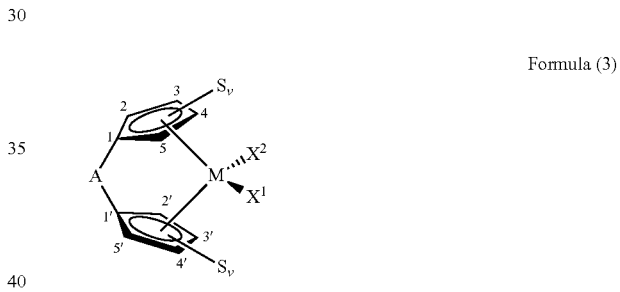

Formula (3)

wherein M is a group 3, 4, 5 or 6 transition metal atom, or a lanthanide metal atom, or actinide metal atom, preferably a group 4 transition metal atom selected from titanium, zirconium or hafnium; $S_v$ is the same as in formula 1 where the subscript "v" denotes the carbon atom on each cyclopentadienyl ring to which the substituent is bonded and where there can be zero to four substituents, $S_v$, on each cyclopentadienyl ring provided that the cyclopentadienyl rings are symmetrically substituted (as defined below) A is a bridging group as defined above in Formula (1), and $X_1$ and $X_2$ are as defined in Formula (1);

"Symmetrically substituted" in relation to the $S_v$ ligands in formula (3) is defined to mean that the metallocene framework has a plane of symmetry that bisects M and A. Thus, where the cyclopentadienyl rings include substituents, they should be substituted in the 2 and 2' positions and/or 3 and 3' positions and/or 4 and 4' positions and/or 5 and 5' positions with S groups that are of approximately of the same steric bulk. Typically the sizes of these $S_v$ groups are within 2 carbons of each other. Thus cyclopentadienyl rings substituted at the 2 and the 2' positions with methyl and ethyl respectively, or substituted at the 3 and the 3' positions with hexyl and octyl respectively, would be considered symmetrical. Likewise, the cyclopentadienyl rings may be substituted at all four sites with $S_v$ groups and be considered symmetrical as long as each of the symmetrical pairs are of similar steric bulk. Additionally, two adjacent $S_v$ groups may be linked to form a ring provided that the new ring is also symmetrically substituted.

Illustrative, but not limiting examples of preferred transition metal compounds of formula (3) are:

meso μ-(CH$_3$)$_2$Si(indenyl)$_2$M(X$^1$)(X$^2$)
meso μ-(CH$_3$)$_2$C(indenyl)$_2$M(X$^1$)(X$^2$)
meso-μ-(CH$_3$)$_2$Si(tetrahydroindenyl)$_2$M(X$^1$)(X$^2$)
meso μ-(CH$_3$)$_2$C(tetrahydroindenyl)$_2$M(X$^1$)(X$^2$)
meso μ-(C$_6$H$_5$)$_2$Si(indenyl)$_2$M(X$^1$)(X$^2$)
meso μ-(C$_6$H$_5$)$_2$C(indenyl)$_2$M(X$^1$)(X$^2$)
(CH$_3$)$_2$Si(tetramethylcyclopentadienyl)(cyclopentadienyl)M(X$^1$)(X$^2$)
(CH$_3$)$_2$Si(2-methylcyclopentadienyl)(cyclopentadienyl)M(X$^1$)(X$^2$)
(CH$_3$)$_2$C(tetramethylcyclopentadienyl)(cyclopentadienyl)M(X$^1$)(X$^2$)

wherein M is chosen from a group consisting of Zr and Hf and wherein X$^1$ and X$^2$ are as described above, and are preferably independently selected from F, Cl, Br, CH$_2$Ph and CH$_3$. In a preferred embodiment X$^1$ and X$^2$ are the same.

The Second Catalyst

The second catalysts are those of capable polymerizing C$_2$-C$_{20}$ olefin to produce a polymer having a crystallinity of 20% or more. In particular the catalyst system employed in the present process comprises a bridged bis-indenyl metallocene compound (pre-catalyst) of the formula:

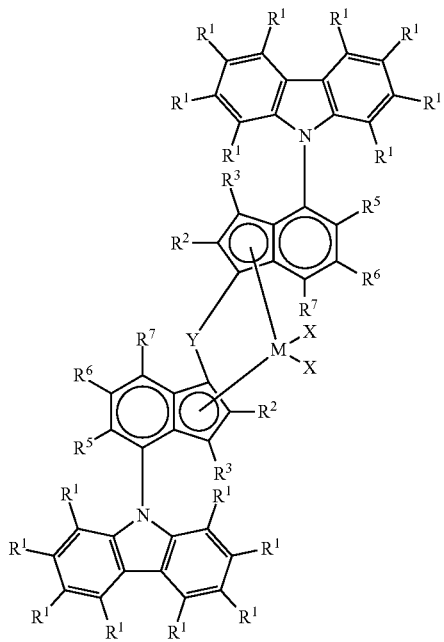

wherein
M is group 4 metal, preferably titanium, zirconium or hafnium, especially zirconium;
each R$^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent R$^1$ groups may join together to form a substituted or unsubstituted, saturated, partially unsaturated, or aromatic cyclic or polycyclic substituent;
each R$^2$, R$^3$, R$^5$, R$^6$ and R$^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;
Y is a bridging group; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand; or both X can also be joined to form a anionic chelating ligand.

Suitable radicals for the each of the groups R$^1$, R$^2$, R$^3$, R$^5$, R$^6$ and R$^7$ are selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(triflouromethyl)phenyl; and from all isomers of benzyl, and all isomers of hydrocarbyl substituted benzyl including methylbenzyl, dimethylbenzyl.

In some embodiments of the invention, it is preferred that each R$^1$, R$^2$, R$^3$, R$^5$, R$^6$ and R$^7$ is selected from, hydrogen, methyl, ethyl, n-propyl, iso-propyl, n-butyl, sec-butyl, iso-butyl, tert-butyl, pentyl, hexyl, cyclohexyl, phenyl, or trifluoromethyl.

In some embodiments R$^2$, R$^3$, R$^5$, R$^6$ and R$^7$ on adjacent atoms may join together to form a substituted or unsubstituted saturated, partially unsaturated or aromatic cyclic or polycyclic ring structure.

In another embodiment, each R$^1$ is hydrogen and each of R$^2$, R$^3$, R$^5$, R$^6$ and R$^7$ is, independently, hydrogen, or a hydrocarbyl group having 1-10 carbon atoms. In one embodiment, R$^2$ is methyl and each of R$^1$, R$^3$, R$^5$, R$^6$, and R$^7$ is hydrogen.

In another embodiment, Y is selected from R'$_2$C, R'$_2$Si, R'$_2$Ge, R'$_2$CCR'$_2$, R'$_2$CCR'$_2$CR'$_2$, R'C=CR', R'C=CR'CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'$_2$C—NR', R'$_2$C—NR'—CR'$_2$, R'P, R'$_2$C—PR', and R'$_2$C—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group Y include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

Preferred examples for the bridging group Y include $CH_2$, $CH_2CH_2$, $C(CH_3)_2$, $SiMe_2$, $SiPh_2$, $SiMePh$, $Si(CH_2)_3$, and $Si(CH_2)_4$.

Suitable examples for X include chloride, bromide, fluoride, iodide, hydride, and $C_1$-$C_{20}$ hydrocarbyls, preferably methyl, ethyl, propyl, butyl, pentyl, hexyl, phenyl, benzyl, and all isomers thereof, or two X's together are selected from $C_4$-$C_{10}$ dienes, preferably butadiene, methylbutadiene, pentadiene, methylpentadiene, dimethylpentadiene, hexadiene, methylhexadiene, dimethylhexadiene, or from $C_1$-$C_{10}$ alkylidenes, preferably methylidene, ethylidene, propylidene, or from $C_3$-$C_{10}$ alkyldiyls, preferably propandiyl, butandiyl, pentandiyl, and hexandiyl.

Preferred examples for X are chloride, bromide, fluoride, benzyl, and methyl.

The catalyst precursor described above is preferably present in the d/l enantiomeric (racemic) form, although may in some cases contain small amounts of the meso isomer.

In another embodiment, the catalyst precursor described above is associated with one or more molecules of a Lewis base such as THF or diethylether. The Lewis base may be datively bonded to the metal center, or associated to the molecule though a weaker interaction such as via Van der Waals forces. Solvent molecules such as toluene or benzene my also be associated with the catalyst precursor by such weaker interactions.

Synthesis of the present catalyst precursor can readily be achieved by synthetic procedures described in U.S. Pat. No. 7,276,567 and U.S. Ser. No. 12/016,346, filed on Jan. 18, 2008. Described within are Pd-phosphine catalyzed coupling reactions between bromo substituted indenes and nitrogen containing heterocycles wherein the products produced are heterocyclic substituted indenes wherein the heterocyclic substituent is bonded to the indene via the nitrogen atom. Starting reagents such as 2-methyl-4-bromoindene can now readily be prepared in a two pot reaction procedure starting from commercially available reagents (see for example the preparation of complex 25 in U.S. Pat. No. 7,276,567). In a subsequent reaction, 2-methyl-4-bromoindene can be coupled with heterocycles such as pyrrole or indole and now carbazole (herein described in the experimental section) using Pd-phosphine coupling catalysis. (Previously, formation of compounds such as 2-methyl-4-(indol-1-yl)indene was a seven pot reaction procedure as described in JP3323347B2 and which did not readily lend itself to making other heterocyclic substituted indenes in only a few synthetic steps.) In this coupling reaction, 2-methyl-4-bromoindene reacts with, for example, carbazole, to form a new substituted indene compound where the carbazole is bonded to indene through the heteroatom producing 2-methyl-4-(carbazol-9-yl)indene. Two equivalents of 2-methyl-4-(carbazol-9-yl) indene can be lithiated and reacted with one equivalent of dimethylsilyldichloride to from the catalyst precursor ligand, bis[2-methyl-4-(carbazol-9-yl)inden-1-yl](dimethyl)silane. This complex can subsequently be doubly deprotonated and reacted with a metal halide such as $ZrCl_4(THF)_2$ to form rac and meso isomers of dimethylsilylene-bis[2-methyl-4-(carbazol-9-yl)inden-1-yl]zirconium dichloride which can be separated by typical extraction and recrystallization procedures. Alternatively, the catalyst precursor ligand can be reacted with a metal amide such as $Zr(NMe_2)_4$ to form rac and meso isomers of dimethylsilylene-bis[2-methyl-4-(carbazol-9-yl)inden-1-yl]zirconium bis(dimethylamide). This complex can be used as a pre-catalyst or converted to a dihalide complex by reaction with an acid halide such as HCl or silylhalide such as $Me_3SiCl$. Similarly, the catalyst precursor ligand can be reacted with chelating amide metal halide such as [PhN$(CH_2)_3$NPh]$ZrCl_2$ to form rac-dimethylsilylene-bis [2-methyl-4-(carbazol-9-yl)inden-1-yl]zirconium($N^1,N^3$-diphenylpropane-1,3-diamide). This complex can be used as a pre-catalyst or converted to a dihalide complex by reaction with an acid halide such as HCl. The dimethylated version of the complex, dimethylsilylene-bis[2-methyl-4-(carbazol-9-yl)inden-1-yl]zirconium dimethyl, can be readily made by reaction of the zirconium dichloride complex with a Grinard such as MeMgCl, or other methylating reagents.

In a preferred embodiment, the second catalyst compound is selected from the group consisting of dimethylsilylene-bis [2-methyl-4-(carbazol-9-yl)inden-1-yl]zirconium dimethyl, dimethylsilylene-bis[2-methyl-4-(carbazol-9-yl)inden-1-yl] zirconium dibenzyl, dimethylsilylene-bis[2-methyl-4-(carbazol-9-yl)inden-1-yl]zirconium dichloride, dimethylsilylene-bis[2-methyl-4-(carbazol-9-yl)inden-1-yl]zirconium dibromide, dimethylsilylene-bis[2-methyl-4-(carbazol-9-yl) inden-1-yl]zirconium difluoride, dimethylsilylene-bis[2-methyl-4-(carbazol-9-yl)inden-1-yl]zirconium bis(dimethylamide), and dimethylsilylene-bis[2-methyl-4-(carbazol-9-yl) inden-1-yl]zirconium ($N^1,N^3$-diphenylpropane-1,3-diamide).

In a more preferred embodiment, the catalyst compound is selected from the group consisting of dimethylsilylene-bis[2-methyl-4-(carbazol-9-yl)inden-1-yl]zirconium dimethyl, dimethylsilylene-bis[2-methyl-4-(carbazol-9-yl)inden-1-yl] zirconium dichloride and a mixture thereof.

The two transition metal compounds (pre-catalysts) may be used in any ratio. Preferred molar ratios of (A) transition metal compound to produce amorphous polymer to (B) transition metal compound to produce crystalline polymer fall within the range of (A:B) 1:1000-1000:1, alternatively 1:100-500:1, alternatively 1:10-200:1, alternatively 1:1-100:1, and alternatively 1:1-75:1, and alternatively 5:1-50:1. The particular ratio chosen will depend on the exact pre-catalysts chosen, the method of activation, and the end product desired. In a particular embodiment, when using the two pre-catalysts (A—"amorphous polymer producing pre-catalyst" and B—"crystalline polymer producing catalyst"), where both are activated with the same activator, the preferred mole percents, based upon the molecular weight of the pre-catalysts, are 10-99.9% A to 0.1-90% B, alternatively 25-99% A to 0.5-50% B, alternatively 50-99% A to 1-25% B, and alternatively 75-99% A to 1-10% B.

Optional Third Catalyst

A third pre-catalyst can optionally be added to the catalyst system. Third catalyst can be defined by the formula of either the first catalyst or second catalyst, but cannot be identical to the exact catalyst structure of the first and second catalysts used in the catalyst system. The third catalyst may also be any polymerization catalyst, especially any of those described in U.S. Pat. No. 7,294,681.

The three transition metal compounds may be used in any ratio. Preferred molar ratios of (A) transition metal compound to produce amorphous polypropylene to (B) transition metal compound to produce crystalline polypropylene to (C) transition metal compound to produce another polymer fall within the range of (A:B:C) 1:1000:500-1000:1:1, alternatively 1:100:50-500:1:1, alternatively 1:10:10-200:1:1, alternatively 1:1:1-100:1:50, and alternatively 1:1:10-75:1:50, and alternatively 5:1:1-50:1:50. The particular ratio chosen will depend on the exact catalyst compounds chosen, the method of activation, and the end product desired.

Catalyst Activation

In addition to the catalyst precursor described above, the catalyst system employed in the present process employs an activator preferably selected from alumoxanes, such as methyl alumoxane, modified methyl alumoxane, ethyl alumoxane, iso-butyl alumoxane and the like; neutral activators such as triphenyl boron, tris-perfluorophenyl boron, tris-perfluoronaphthylboron, tris-perfluorophenyl aluminum and the like; and ionic activators such as N,N-dimethylanilinium tetrakis perfluorophenyl borate, triphenyl carbonium tetrakis perfluorophenyl borate, N,N-dimethylanilinium tetrakis perfluoronaphthyl borate, N,N-dimethylanilinium tetrakis perfluorophenyl aluminate and the like.

A co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators are typically only used in combination with neutral activators and ionic activators when the pre-catalyst is not a dihydrocarbyl or dihydride complex.

The alumoxane component useful as an activator typically is an oligomeric aluminum compound represented by the general formula $(R^x—Al—O)_n$, which is a cyclic compound, or $R^x(R^x—Al—O)_nAlR^x_2$, which is a linear compound. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see, EP 0 279 586, EP 0 594 218, EP 0 561 476, WO94/10180 and U.S. Pat. Nos. 4,665,208, 4,874,734, 4,908,463, 4,924,018, 4,952,540, 4,968,827, 5,041,584, 5,091,352, 5,103,031, 5,157,137, 5,204,419, 5,206,199, 5,235,081, 5,248,801, 5,329,032, 5,391,793, and 5,416,229.

When an alumoxane or modified alumoxane is used, the pre-catalyst (all pre-catalysts)-to-activator molar ratio is from about 1:3000-10:1; alternatively, 1:2000-10:1; alternatively 1:1000-10:1; alternatively, 1:500-1:1; alternatively 1:300-1:1; alternatively 1:200-1:1; alternatively 1:100-1:1; alternatively 1:50-1:1; alternatively 1:10-1:1. When the activator is an alumoxane (modified or unmodified), some embodiments select the maximum amount of activator at a 5000-fold molar excess over the pre-catalyst (per metal catalytic site). The preferred minimum activator-to-pre-catalyst-ratio is 1:1 molar ratio.

NCA activators (at times used in combination with a co-activator) may be used in the practice of this invention. Preferably, discrete ionic activators such as $[Me_2PhNH][B(C_6F_5)_4]$, $[Ph_3C][B(C_6F_5)_4]$, $[Me_2PhNH][B((C_6H_3\text{-}3,5\text{-}(CF_3)_2))_4]$, $[Ph_3C][B((C_6H_3\text{-}3,5\text{-}(CF_3)_2))_4]$, $[NH_4][B(C_6H_5)_4]$, $[Me_2PhNH][B(C_{10}F_7)_4]$, $[Ph_3C][B(C_{10}F_7)_4]$, or neutral activators such as $B(C_6F_5)_3$, $B(C_{10}F_7)_3$ or $B(C_6H_5)_3$ can be used (where $C_6F_5$ is perfluorophenyl, $C_{10}F_7$ is perfluoronaphthyl, $C_6H_3\text{-}3,5\text{-}(CF_3)_2$ is 3.5-bis(trifluoromethyl)phenyl). Preferred co-activators, when used, are alumoxanes such as methyl alumoxane, modified alumoxanes such as modified methyl alumoxane, and aluminum alkyls such as tri-isobutyl aluminum, and trimethyl aluminum.

It is within the scope of this invention to use one or more type of NCA activators, which may be neutral or ionic, such as tri(n-butyl)ammonium tetrakis(pentafluorophenyl)borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459).

Activated ionic catalysts can be prepared by reacting a transition metal compound (pre-catalyst) with a neutral activator, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction.

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1-20 carbon atoms, alkyl groups having 1-20 carbon atoms, alkoxy groups having 1-20 carbon atoms and aryl groups having 3-20 carbon atoms (including substituted aryls). More preferably, the three groups are alkyls having 1-4 carbon groups, phenyl, naphthyl or mixtures thereof. Even more preferably, the three groups are halogenated, preferably fluorinated, aryl groups. Most preferably, the neutral NCA activator is trisperfluorophenyl boron or trisperfluoronaphthyl boron.

Ionic NCA activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124 and U.S. Ser. No. 08/285,380, filed Aug. 3, 1994, all of which are herein fully incorporated by reference. In this case, the ionic activator reacts with the transition metal compound (pre-catalyst) to form a cationic transition metal species, an anion, and byproduct(s). The byproducts are defined by the cation associated with the ionic NCA activator used.

Compounds useful as an ionic NCA activator comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EP-A-0 277 003 and EP-A-0 277 004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the ionic NCA activators include a cation and an anion component, and may be represented by the following formula:

$$(L^{**}-H)_d^+(A^{d-})$$

wherein $L^{}$ is an neutral Lewis base; H is hydrogen; $(L^{}-H)^+$ is a Bronsted acid; $A^{d-}$ is a non-coordinating anion having the charge d−; d is an integer from 1-3.

The cation component, $(L^{**}-H)_d^+$ may include Bronsted acids such as protons or protonated Lewis bases or reducible Lewis acids capable of protonating or abstracting a moiety, such as an alkyl or aryl, from the pre-catalyst after alkylation.

The activating cation $(L^{}-H)_d^+$ may be a Bronsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}-H)_d^+$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q_n]^{d-}$ wherein k is an integer from 1-3; n is an integer from 2-6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1-20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of ionic NCA activators which may be used as an activator in the preparation of the catalysts of this invention include tri-substituted ammonium salts such as:
trimethylammonium tetraphenylborate, triethylammonium tetraphenylborate, tripropylammonium tetraphenylborate, tri (n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2, 3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3, 4,6-tetrafluorophenyl)borate, N,N-dimethyl-(2,4,6-trimethylanilinium) tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis (trifluoromethyl)phenyl)borate, tri(n-butyl)ammonium tetrakis(3,5-bis(trifluoromethyl)phenyl)borate, tri(tert-butyl) ammonium tetrakis(3,5-bis(trifluoromethyl)phenyl)borate, N,N-dimethylanilinium tetrakis(3,5-bis(trifluoromethyl) phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, and dialkyl ammonium salts such as: di-(iso-propyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis (pentafluorophenyl)borate, triethylsilylium tetrakis (pentafluorophenyl)borate, benzene(diazonium) tetrakis (pentafluorophenyl)borate, tropillium tetrakis-(2,3,4,6-tetrafluorophenyl)borate, triphenylcarbenium tetrakis-(2,3,4, 6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropillium tetrakis (perfluoronaphthyl)borate, triphenylcarbenium tetrakis(perfluoronaphthyl)borate, triphenylphosphonium tetrakis(perfluoronaphthyl)borate, triethylsilylium tetrakis (perfluoronaphthyl)borate, benzene(diazonium) tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium) tetrakis(3,5-bis(trifluoromethyl)phenyl)borate.

Most preferably, the ionic NCA activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis (3,5-bis(trifluoromethyl) phenyl)borate, or triphenylcarbenium tetra(perfluorophenyl) borate.

The catalyst precursors employed in the present process can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor.

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal complex cation in the sense of balancing its ionic charge at +1, and yet retain sufficient lability to permit displacement by an ethylenically or acetylenically unsaturated monomer during polymerization. These types of cocatalysts sometimes use scavengers such as but not limited to tri-iso-butyl aluminum, tri-n-octyl aluminum, tri-n-hexyl aluminum, triethylaluminum or trimethylaluminum.

The present process also can employ cocatalyst compounds or activator compounds that are initially neutral Lewis acids but form a cationic metal complex and a noncoordinating anion, or a zwitterionic complex upon reaction with the alkylated transition metal compounds. The alkylated transition metal compound is formed from the reaction of the catalyst pre-cursor and the co-activator. For example, tris (pentafluorophenyl)boron or aluminum act to abstract a hydrocarbyl ligand to yield an invention cationic transition metal complex and stabilizing noncoordinating anion, see EP-A-0 427 697 and EP-A-0 520 732 for illustrations of analogous group 4 metallocene compounds. Also, see the methods and compounds of EP-A-0 495 375. For formation of zwitterionic complexes using analogous Group 4 compounds, see U.S. Pat. No. 5,624,878, U.S. Pat. No. 5,486,632, and U.S. Pat. No. 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an NCA activator is used, the pre-catalyst (all pre-catalysts)-to-activator molar ratio is from 1:10-1:1; 1:10-10: 1; 1:10-2:1; 1:10-3:1; 1:10-5:1; 1:2-1.2:1; 1:2-10:1; 1:2-2:1; 1:2-3:1; 1:2-5:1; 1:3-1.2:1; 1:3-10:1; 1:3-2:1; 1:3-3:1; 1:3-5: 1; 1:5-1:1; 1:5-10:1; 1:5-2:1; 1:5-3:1; 1:5-5:1; 1:1-1:1.2. The pre-catalyst-to-co-activator molar ratio is from 1:100-100:1; 1:75-75:1; 1:50-50:1; 1:25-25:1; 1:15-15:1; 1:10-10:1; 1:5-5:1, 1:2-2:1; 1:100-1:1; 1:75-1:1; 1:50-1:1; 1:25-1:1; 1:15-1: 1; 1:10-1:1; 1:5-1:1; 1:2-1:1; 1:10-2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl) boron, and mixtures of trimethyl aluminum or triethyl aluminum or triisobutyl aluminum or tri-n-octylaluminum with dimethylanilinium tetrakis(pentafluorophenyl)borate or tris (pentafluorophenyl)boron or dimethylanilinium tetrakis(perfluoronaphthyl)borate. Particularly preferred activator/co-activator combinations include tri-n-octylaluminum with dimethylanilinium tetrakis(pentafluorophenyl)borate, tri-n-octylaluminum with dimethylanilinium tetrakis(perfluoronaphthyl)borate, and methylalumoxane with dimethylanilinium tetrakis(pentafluorophenyl)borate.

In some embodiments, scavenging compounds are used with NCA activators. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, isomers thereof, and each Z is independently $R^x$ or a different univalent anionic ligand such as halogen (Cl, Br, I), alkoxide ($OR^x$) and the like. Most preferred aluminum alkyls include triethylaluminum, diethylaluminum chloride, tri-isobutylaluminum, tri-n-octylaluminum. tri-n-hexylaluminum, trimethylaluminum and the like. Preferred boron alkyls include triethylboron. Scavenging compounds may also be alumoxanes and modified alumoxanes including methylalumoxane and modified methylalumoxane.

Monomers

In a preferred embodiment the polymer blend produced in this invention comprises an olefin homopolymer or copolymer, comprising one or more $C_2$-$C_{40}$ alpha-olefins. In a preferred embodiment the polymer blend produced in this invention comprises an olefin homopolymer or copolymer, comprising one or more $C_3$-$C_{40}$ alpha-olefins. In another preferred embodiment the olefin polymer blend further comprises one or more diolefin comonomers, preferably one or more $C_4$-$C_{40}$ diolefins.

In a preferred embodiment the polymer blend comprises an olefin homopolymer or copolymer, having less than 5 mol % ethylene, and comprising one or more $C_3$-$C_{40}$ alpha-olefins, preferably propylene. In another preferred embodiment the olefin polymer, having less than 5 mol % ethylene, further comprises one or more diolefin comonomers, preferably one or more $C_4$-$C_{40}$ diolefins.

In a preferred embodiment the polymer blend produced herein comprises propylene homopolymers or copolymers. The comonomer is preferably a $C_4$-$C_{20}$ linear, branched or cyclic monomer, and in one embodiment is a $C_4$-$C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. Ethylene may be present at 5 mol % or less.

In another embodiment the polymer produced herein is a copolymer of one or more linear or branched $C_3$-$C_{30}$ prochiral alpha-olefins or $C_5$-$C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

The polymerizable olefinic moiety can be linear, branched, cyclic-containing, or a mixture of these structures. Preferred linear alpha-olefins include $C_3$-$C_{20}$ alpha-olefins, more preferably propylene, 1-butene, 1-hexene, and 1-octene, even more preferably propylene or 1-butene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$-$C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$-$C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$-$C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4-30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 wt %, preferably at 0.00001-1.0 wt %, preferably 0.002-0.5 wt %, even more preferably 0.003-0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the olefin polymer blend comprises homo-polypropylene. In another embodiment the olefin polymer blend comprises propylene, ethylene, preferably less than 5 mol % ethylene, and at least one divinyl comonomer. In another embodiment the olefin polymer comprises propylene and at least one divinyl comonomer.

In another embodiment, the olefin polymer blend comprises a polymer comprising: a first monomer present at from 40-95 mole %, preferably 50-90 mole %, preferably 60-80 mole %, and a comonomer present at from 5-40 mole %, preferably 10-60 mole %, more preferably 20-40 mole %, and a termonomer present at from 0-10 mole %, more preferably from 0.5-5 mole %, more preferably 1-3 mole %.

In a preferred embodiment the first monomer comprises one or more of any $C_3$-$C_8$ linear, branched or cyclic alpha-olefins, including propylene, butene (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, and the like.

In a preferred embodiment the comonomer comprises one or more of any $C_2$-$C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, styrene, 3,5,5-trimethylhexene-1,3-methylpentene-1,4-methylpentene-1, norbornene and cyclopentene.

In a preferred embodiment the termonomer comprises one or more of any $C_2$-$C_{40}$ linear, branched or cyclic alpha-olefins, (preferably ethylene, if present, is present at 5 mole % or less), including, but not limited to, ethylene, propylene, butene, pentene, hexene, heptene, and octene, nonene, decene, undecene, dodecene, hexadecene, butadiene, 1,5-hexadiene, 1,6-heptadiene, 1,4-pentadiene, 1,7-octadiene, 1,8-nonadiene, 1,9-decadiene, 1,11-dodecadiene, styrene, 3,5,5-trimethylhexene-1,3-methylpentene-1, 4-methylpentene-1, and cyclopentadiene.

In a preferred embodiment the polymer comprises propylene and from 0-50 mole % ethylene, preferably from 0-30 mole % ethylene, more preferably from 0-15 mole % ethylene, more preferably from 0-10 mole % ethylene, more preferably from 0.5-5 mole % ethylene.

In a preferred embodiment the polymer comprises propylene and from 0-50 mole % butene, preferably from 0-30 mole % butene, more preferably from 0-15 mole % butene, more preferably from 0-10 mole % butene, more preferably from 0.5-5 mole % butene.

In a preferred embodiment the polymer comprises propylene and from 0-50 mole % hexene, preferably from 0-30 mole % hexene, more preferably from 0-15 mole % hexene, more preferably from 0-10 mole % hexene, more preferably from 0.5-5 mole % hexene.

End Uses

The polymer blend can be used in many applications where typical thermoplastic olefin polymers are used. In a particular embodiment, the polymer blend can be used for adhesive application as hot melt adhesives, including but not limited to disposables, packaging, laminates, pressure sensitive adhesives, tapes, labels, wood binding, paper binding, non-wovens, road marking, reflective coatings, and the like. Hot melt adhesives are applied to a substrate when molten, and then placed in contact with a second substrate. The requirements that must be met by such hot-melt adhesives for the various applications are numerous.

The polymer blends produced as described herein (referred to as "the polymer" below for ease of reference) can be used directly as an adhesive or can be with other components to form an adhesive. Examples of such other components include waxes, tackifiers and functionalized polyolefins. However, in view of the low viscosity of the polymer blends, the blends typically contain no more than 20 wt %, typically no more than 10 wt %, of such other components.

In one embodiment, the polymer is further blended with a functionalized polyolefin such that the resulting adhesive composition comprises up to 15 wt %, for example from 1-10 wt %, of the functionalized polyolefin. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha-methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 wt % to about 10 wt %, preferably at about 0.5 wt % to about 7 wt %, even more preferably at about 1 to about 4 wt %, based upon the weight of the hydrocarbon resin and the unsaturated acid or anhydride. In one preferred embodiment the functionalized polyolefin is maleated polypropylene.

In yet another aspect, the adhesive composition can include 15% by weight or less, or 10% by weight or less, or 5% by weight or less of one or more additives selected from plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

In preferred embodiments, the adhesive compositions have a Shear Adhesion Fail Temperature (SAFT) of at least 100° C., a viscosity of less than 25,000 mPa·sec, such as less than 10,000 mPa·sec, for example less than 5,000 mPa·sec, typically less than 1,000 mPa·sec at 190° C., and a set time of less than 3 seconds, typically less than 2 seconds. High melting temperature of the polymer blend allows the adhesive to have better heat resistance and higher SAFT.

In preferred embodiments, the blends of this invention are heat stable, by which is meant that the Gardner color of the composition (as determined by ASTM D-1544-68) that has been heat aged (e.g., maintained) at or 180° C. for 48 hours, does not change by more than 7 Gardner units when compared to the Gardner color of the initial composition. Preferably, the Gardner color of the composition after heating above its melting point for 48 hours does not change by more than 6, more preferably 5, still more preferably 4, still more preferably 3, still more preferably 2, still more preferably 1 Gardner color unit, as compared to the initial composition prior to being heated.

In a particular embodiment, the polymer blend can be used in a packaging article. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce, just to name a few exemplary uses.

When used in a packaging adhesive application, the polymer blend typically has a heat of fusion of 60 J/g or less and a viscosity of less than 1500 mPa·sec at 190° C. as measured using Brookfield viscometer; a tensile strength of at least 0.5 MPa, preferably at least 1 MPa, more preferably at least 2 MPa; an elongation (also referred to as elongation at break) of at least 20%, preferably at least 50%, more preferably at least 80%. Viscosity of the polymer blend can be adjusted through polymerization temperatures.

The adhesive composition may also be formulated to have a viscosity of less than 1000 mPa·sec at 190° C. as measured using Brookfield viscometer; has tensile strength of at least 0.5 MPa, preferably at least 1 MPa, more preferably at least 2 MPa; has an elongation of at least 30%, preferably at least 80%, more preferably at least 120%. The viscosity of the formulated adhesives can be adjusted through the viscosity of the polymer blend as well as the viscosity of additives.

Adhesive compositions containing the polymers described herein exhibit a novel and advantageous balance of properties including: at least 1% fiber tear at −18° C. and at least 10% fiber tear at 25° C. using Inland paper board as a substrate, a set time of less than 4 seconds, and a viscosity of less than 5,000 mPa·sec at 190° C.

The adhesive composition may also be formulated to have fiber tear of greater than 80% at room temperature, and have fiber tear of greater than 10% at −2° C. All the fiber tears should be tested on inland paper board using the procedure described herein. The adhesive composition is also formulated to have a set time of less than 4 seconds, preferably less than 3 seconds, more preferably less than 2 seconds.

One formulation of the adhesive composition comprises at least 80 wt % of the polymer blend of the present invention, up to 10 wt % of one or more tackifiers, up to 10 wt % of one or more waxes, and up to 15 wt % of one or more additives. Another typical formulation of the adhesive composition comprises at least 85 wt % of the polymer blend of the present invention, up to 5 wt % of one or more tackifiers, up to 5 wt % of one or more waxes, up to 10 wt % of functionalized polyolefin and up to 15 wt % of one or more additives. Yet another typical formulation of the adhesive composition comprises at least 90 wt % of the polymer blend of the present invention, up to 5 wt % of one or more tackifiers, up to 5 wt % of one or more waxes, up to 10 wt % of functionalized polyolefin and up to 10 wt % of one or more additives.

In a particular embodiment, the polymer blend can be used as an adhesive in disposable articles. Exemplary disposable articles may include diapers, training pants, sanitary napkins, panty liners, incontinent wear, bed pads, surgical gowns, surgical drapes, rodent traps, hook and loop fasteners, garments, medical garments, swimwear, or combinations thereof. The polymer blend for disposable adhesive applications preferably has a viscosity of less than 10,000 mPa·sec at 190° C. as measured using Brookfield viscometer and a heat of fusion of 40 J/g or less. The adhesive composition is preferably also formulated to have a viscosity of less than 10,000 mPa·sec at 190° C. as measured using Brookfield digital viscometer.

In still yet another aspect the invention resides in an adhesive composition comprising the polymer blend comprising a crystalline component having a crystallinity of 20% or more, and an amorphous component having a crystallinity of 10% or less, wherein the copolymer has a viscosity at 190° C. of at least 530 mPa·sec and a heat of fusion between about 10 and about 70 J/g, and wherein the adhesive composition has the following properties:
(a) a viscosity of 25,000 mPa·sec or less sec at 190° C.;
(b) a Dot T-Peel adhesion of at least 10 Newton for adhesion between two polyethylene terephthalate (PET) films at room temperature (25° C.);
(c) a Dot T-Peel adhesion of at least 10 Newton for adhesion between two PET films at 40° C.; and
(d) an elongation of at least 400%.

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture, trim, molding, doors, sashes, windows, millwork and cabinetry, for example.

In yet another aspect the invention resides in an adhesive composition comprising the polymer blend comprising a crystalline component having a crystallinity of 20% or more, and an amorphous component having a crystallinity of 10% or less, wherein the blend has a viscosity at 190° C. of at least 530 mPa·sec and a heat of fusion between about 10 and about 70 J/g, and wherein the adhesive composition has the following properties:
(a) a viscosity of less than 25,000 mPa·sec at 190° C.;
(b) a Dot T-Peel adhesion of at least 10 Newton for adhesion between a fiber board and a fabric substrate;
(c) a set time of 10 seconds or less;
(d) an open time of 3 seconds or longer; and
(e) an elongation of at least 200%.

In yet another aspect, the adhesive composition has an open time of 3 seconds or more. Preferably, the adhesive composition has an open time of 20 seconds or more. More preferably, the adhesive composition has an open time of 60 seconds or more. In another aspect, the adhesive composition has a set time of 5 minute or less, preferably 3 minutes or less, more preferably 2 minutes or less.

In addition, tackifiers may be used with the polymer produced in this invention at up to 50 wt %. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

Polymer Blends

In another embodiment the polymer produced in this invented process may be blended with one or more additional polymers to produce a blend in which the present copolymer is present in an amount of from 10-99 wt %, preferably 20-95 wt %, even more preferably at least 30-90 wt %, even more preferably at least 40-90 wt %, even more preferably at least 50-90 wt %, even more preferably at least 60-90 wt %, even more preferably at least 70-90 wt %, based upon the total weight of the polymers in the blend. Such blends may be produced by mixing the polymers together, by connecting reactors together in series to make reactor blends. The polymers can be mixed together prior to being put into the extruder or may be mixed in an extruder.

This invention relates to:
1. A propylene polymer comprising a component having a crystallinity of 10% or less (preferably 5% or less, preferably 3% or less, preferably 1% or less) and a component having a crystallinity of 20% or more (preferably 30% or more, preferably 50% or more), said propylene polymer having:
a) a melting point of X° C. or more where $X=-0.0038(Tp)^2+0.36(Tp)+150$, where Tp is the temperature of polymerization in ° C. (preferably $X=-0.0038(Tp)^2+0.36(Tp)+152$, preferably $X=-0.0038(Tp)^2+0.36(Tp)+154$, preferably $X=-0.0038(Tp)^2+0.36(Tp)+156$, preferably $X=-0.0038(Tp)^2+0.36(Tp)+158$);
b) an Mw of 10,000 g/mol or more (preferably 25,000 g/mol or more, preferably 40,000 g/mol or more, preferably form 10,000-500,000 g/mol);
c) a heat of fusion of from 1-70 J/g (preferably 1-60 J/g or more, preferably 2-50 J/g or more);
d) Stereodefects per 10,000 monomer units of Y or less where $Y=2.35(Tp)-100$ (where Tp is the temperature of polymerization in ° C.) for the portion of the blend that is insoluble in hexane at 23° C.;
e) a dot T-Peel on Kraft paper of 1 N or more (preferably 3N or more, preferably 5N or more, preferably between 1 and 10,000 N); and
f) a branching factor of 0.98 or less, where the branching factor is the ratio of g' measured at Mz to g' measured at Mw (preferably 0.98 or less, preferably 0.95 or less, preferably 0.92 or less).
2. The polymer of paragraph 1 where the component having a crystallinity of 10% or less is present at greater than 2 wt % (preferably greater than 10 wt %, preferably greater than 20 wt %) and the component having a crystallinity of 20% or more is present at greater than 2 wt % (preferably greater than 10 wt %, preferably greater than 20 wt %).

3. The polymer of paragraph 1 or 2 wherein the polymer has a melting temperature of 135° C. or higher, preferably 140° C. or more, preferably 145° C. or more, preferably 150° C. or more, preferably 155° C. or more.

4. The polymer of any of paragraphs 1-3 wherein the polymer has an amorphous content of at least 30% (alternately at least 50%) and or a crystallinity of 60% or less, preferably from 10-50%).

5. The polymer of any of paragraphs 1-4 wherein the polymer has a Brookfield viscosity at 190° C. of at least 500 mPa·sec (preferably 1000-50,000 mPa·sec).

6. The polymer of any of paragraphs 1-5 wherein the polymer has a 20 wt % or more (preferably 30 wt % or more) of hexane room temperature soluble fraction and 70 wt % or less (preferably 1-50 wt %) of Soxlet boiling heptane insolubles (based upon the weight of the starting polymer).

7. The polymer of paragraph 6 where the Soxlet boiling heptane insoluble fraction has: 1) a g' measured at the Mz of the fraction of 0.90 or less (preferably 0.85 or less, preferably 0.80 or less) and or 2) an Mz of 20,000-500,000, and or 3) a melting temperature of 150° C. or more (preferably 155° C. or more, preferably 157° C. or more).

8. The polymer of paragraph 6 or 7 where the hexane room temperature soluble fraction has: 1) a melting temperature of 30° C. or less (preferably 20° C. or less), and 2) a heat of fusion of 20 J/g or less (preferably 10 J/g or less, preferably 5 J/g or less) and or 3) has a Shore A hardness of 30 or less (preferably 20 or less).

9. The polymer of any of paragraphs 1-8 where the polymer has 1) an Mw/Mn of at least 1.5 (preferably at least 2, preferably at least 5, preferably at least 10, preferably from 2-20); and or 2) a unimodal, bimodal or multimodal SEC trace; and or 3) a Tg of 2° C. or less (preferably 0° C. or less, preferably −5° C. or less, preferably between 0 and −40° C.; and or 4) has a Shore A hardness of 90 or less (preferably 80 or less, preferably 70 or less, alternately from 1-70); and or 5) a $g'_{avg}$ of 0.98 or less (preferably 0.95 or less, preferably 0.90 or less); and or 6) dot T-Peel of 1N to 10,000 Non Kraft paper; and or 7) set time of 60 seconds of less; and or 8) a SAFT of 40-150° C.; and or 9) a heat stability where the Gardner color does not change by more than 7 units (preferably not more than 6 units, preferably not more than 5 units, preferably not more than 4 units, preferably not more than 3 units, preferably not more than 2 units, preferably not more than 1 unit) when aged at 180° C. for 48 hours.

10. An adhesive comprising the composition of any of paragraphs 1-9 having a dot T-Peel of 5-10,000 N.

11. The adhesive of paragraph 10 further comprising tackifier and or functionalized (preferably maleated) polymer.

12. The adhesive of paragraph 10 or 11 where in the adhesive has: 1) a SAFT of at least 100° C., and or 2) a Brookfield Viscosity of 25,000 mPa·sec or less; and or 3) a set time if less than 60 seconds (preferably less than 30 seconds, preferably less than 3 seconds; and or 4) tensile strength of at least 0.5 MPa; and or 5) an elongation at break of at least 20%; and or 6) at least 1% fiber tear at −18° C. and or 7) at least 10% fiber tear at 25° C.

13. A process for producing the propylene polymer of any of paragraphs 1-9 or the adhesive of paragraph of 10, 11 or 12, the process comprising:
1) contacting a monomer composition comprising propylene with a polymerization catalyst system under homogeneous polymerization conditions and at a temperature of about 100° C.-about 195° C., wherein the polymerization catalyst system includes an activator and two catalyst compounds, where the first catalyst compound is capable of producing a polymer having a 10% crystallinity or less (and or a heat of fusion of 10 J/g or less) at said homogeneous polymerization conditions and at a temperature of 100° C.-195° C. and is represented by the formula 1, 2 or 3 as described above (preferably M is Ti, Hf or Zr) and the second catalyst compound is represented by the formula (A) as described above (preferably M is Ti, Hf or Zr).

14. The process of paragraph 13 wherein the process is a continuous process.

15. The process of paragraph 13 or 14 wherein:
a) the first catalyst component produces a polymer having an Mw of 500,000 or less, and a crystallinity of 10% or less;
b) the second catalyst component produces a polymer having an Mw of 500,000 or less, and a crystallinity of 20% or more;
c) the temperature is from 110° C.-195° C. and the catalyst system and monomers are contacted for a residence time of 120 minutes or less,
d) the molar ratio of the first catalyst to the second catalyst is from 1:1-100:1, preferably 1:1-50:1, more preferably 1:1-1:20;
e) the activity of the first and second catalyst components together is at least 3 kilograms of polymer per gram of the catalyst mixture; and
f) at least 50% of the monomers are converted to polymer products having an Mw of 5,000 g/mol or more.

16. The process of any of paragraph 13-15 wherein the polymer of adhesive is pelletized.

17. The process of any of paragraphs 13-16 wherein each $R^1$ is hydrogen and or each of $R^2$, $R^3$, $R^5$, $R^6$ and $R^7$ is, independently, hydrogen, or a hydrocarbyl group having 1-10 carbon atoms.

18. The process of any of paragraphs 13-17 wherein $R^2$ is methyl and or all of $R^1$, $R^3$, $R^5$, $R^6$, and $R^7$ are hydrogen.

19. The process of any of paragraphs 13-18 wherein said monomer consists essentially of propylene and optional further comonomer selected from the group consisting of ethylene, and $C_4$-$C_{20}$ α-olefins, cyclic olefins and α-olefinic diolefins.

20. The process of any of paragraphs 13-19 wherein the second catalyst compound is selected from the group consisting of dimethylsilylene-bis[2-methyl-4-(carbazol-9-yl)inden-1-yl]zirconium dimethyl and dimethylsilylene-bis[2-methyl-4-(carbazol-9-yl)inden-1-yl]zirconium dichloride, or a combination thereof.

21. The process of any of paragraphs 13-20 wherein the activator comprises a non-coordinating anion.

22. The process of claim any of paragraphs 13-21 wherein: the process further comprises: 1) contacting, in a solvent, the catalyst components in the presence of one or more activators with one or more $C_3$-$C_{40}$ olefins, and, optionally one or more diolefins; 2) wherein the ratio of the first catalyst to the second catalyst is from 1:1-50:1; 3) withdrawing polymer solution from the reaction zone; 4) removing at least 10% solvent from the polymer solution; 5) devolatilizing the polymer solution to form molten polymer; 6) optionally combining the molten polymer and one or more additives in a static mixer, and optionally 7) pelletizing the molten polymer and one or more additives.

23. The process of any of paragraphs 13-22 wherein the pellets are pourable free flowing pellets wherein after aging of the pellets at 120° F. for 7 days, the aged pourability value of a 500 gram sample of the pellets is 300 seconds or less.

Tests/Testing Procedures

Substrate fiber tear: The specimens were prepared by combining two 1 inch by 3 inch (2.54 cm×7.62 cm) substrate cut outs with a dot of adhesive with a volume that, when compressed under a 500 gram weight occupies about 1 square inch of area (1 inch=2.54 cm). For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage. All the fiber tear tests were conducted using inland paper board as the substrate. Inland Paper Board is a high performance box board obtained from Inland Paper Board and Packaging Company of Rome, Ga. It is characterized as a #56 virgin high performance paper board stock.

Set time is defined as the time needed for the hot melt adhesive to solidify to the point where it possesses enough strength to form bonds to give substrate fiber tear when pulled apart, and thus the bond is sufficiently strong such that sealed boxes and trays will not pop open right after their exiting the compression section on the packaging line. The bond will likely still strengthen upon further cooling; however, it no longer requires compression. These set times were measured by placing a molten dot of adhesive on to a file folder substrate taped to a flat table. A file folder tab (2.5 cm×7.6 cm) was placed upon the dot 3 seconds later and compressed with a 500-gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens were pulled apart in side-by-side testing (at a rate of 2 inches per minute) by a machine (such as an Instron) that records the destructive force of the insult being applied. The maximum force achieved for each sample tested was recorded and averaged, thus producing the Average Maximum Force, which is reported as the Dot T-Peel.

Open time is determined according to ASTM D4497.

Brookfield Viscosity, viscosity, Adhesive melt viscosity and viscosity profiles vs. temperature were measured using a Brookfield digital viscometer according to ASTM D-3236.

Melting point (Tm), peak crystallization temperature (Tc), glass transition temperature (Tg), heat of fusion (Hf) and percent crystallinity were determined by differential scanning calorimetry (DSC) by the following procedure according to ASTM D3418-03 using a TA Instruments model Q100. Samples weighing approximately 5-10 mg are sealed in aluminum hermetic sample pans. The DSC data were recorded by first gradually heating the sample to 200° C. at a rate of 10° C./minute. The sample was kept at 200° C. for 2 minutes, and then cooled to −90° C. at a rate of 10° C./minute, followed by an isothermal for 2 minutes and heating to 200° C. at 10° C./minute. Both the first and second cycle thermal events are recorded. Areas under the melting peaks are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999, except that a value of 189 J/g (B) is used as the heat of fusion for 100% crystalline polypropylene. The amorphous content (%) is calculated using the formula (100-percent of crystallinity). The melting temperature is measured and reported during the second heating cycle (or second melt).

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period up to about 2 days) or annealed to maximize the level of crystallinity.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors (VIS). It used three Polymer Laboratories PLgel 10 m Mixed-B columns for separation, a flow rate of 0.54 cm$^3$/min, and a nominal injection volume of 300 µL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0-2.0 mg/ml, with lower concentrations being used for higher molecular weight samples.

The branching index (g') in the Examples was measured using the SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used for linear polypropylene. Linear polymers selected as standards for comparison should be of the same viscosity average molecular weight, monomer content and composition distribution. Linear character for polymer containing $C_2$-$C_{10}$ monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is $C_9$ or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticity as measured by Carbon 13 NMR. The viscosity averaged g' was calculated using the following equation:

$$g'_{vis} = \frac{\sum c_i [\eta_i]_b}{\sum c_i KM_i^\alpha}$$

where $c_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

Stress-strain properties such as ultimate tensile strength (tensile strength), ultimate elongation (elongation at break), and 100% modulus were determined at room temperature according to ASTM D638. The specimens were cut from compression molded plaques using a mallet handle die. Specimen dimensions were those specified in ASTM D 638. Tensile properties were measured on an Instron™ model 4502 equipped with a 22.48 lb. load cell and pneumatic jaws fitted with serrated grip faces. Deformation was performed at a constant crosshead speed of 2.0 in/min with a data sampling rate of 25 points/second. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Toughness is defined as the ability of polymer to absorb applied energy. The area under the stress-strain curve is used as a measure of the toughness.

Shore (Durometer) hardness A was determined according to ASTM D 2240 (A or D, 15 second delay).

Ethylene content of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$-4000 $cm^{-1}$ is recorded and the monomer weight percent of ethylene can be calculated according to the following equation: Ethylene wt %=82.585−111.987X+ 30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Examples 1-9

All polymerizations were performed in a liquid filled, single-stage continuous reactor. The reactor was a 0.5-liter stainless steel autoclave reactor and was equipped with a stirrer, water cooling/steam heating element with a temperature controller, and a pressure controller. Solvent and propylene were first purified by passing through a three-column purification system. The purification system consisted of an Oxiclear column (Model #RGP-R1-500 from Labclear) followed by a 5 Å and a 3 Å molecular sieve columns. Purification columns were regenerated periodically whenever there was evidence of lower activity of polymerization. Both the 3 Å and 5 Å molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using Brooksfield mass flow meters or Micro-Motion Coriolis-type flow meters.

The transition metal compound (TMC) was pre-activated with [N,N-dimethylanilinium][tetrakis(pentafluorophenyl)

borate] (obtained from Albemarle) at a molar ratio of about 1:1 in toluene. The catalyst solutions were kept in an inert atmosphere with <1.5 ppm water content and were fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, then a new batch was prepared. Pumping rates of the TNOA solution varied from polymerization reaction to reaction, ranging from 0 (no scavenger) to 4 ml per minutes.

The reactor was first prepared by continuously pumping solvent (e.g., isohexane) and scavenger through the reactor system for at least one hour at a maximum allowed temperature (about 150° C.). After cleaning, the reactor was heated/cooled to the desired temperature using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g. In Examples 1-9, di(p-triethylsilylphenyl)methylene[(cyclopentadienyl)(2,7-di-t-butylfluoren-9-yl)]hafnium dimethyl (CAT#1) was used as the first catalyst to produce amorphous polymer component and rac-dimethylsilylene-bis(2-methyl-4-(carbazol-9-yl)inden-1-yl)zirconium dimethyl (TMC rac-5) was used as the second catalyst to produce polymeric component having a crystallinity of 20% or more. Detailed polymerization condition and some characterization data are listed in Table 1a and Table 1b. The molecular weight (Mn, Mw and Mz) reported in Table 1a and 1b were obtained from the DRI detector in GPC-3D as described above.

TABLE 1a

| | Example # | | | | |
|---|---|---|---|---|---|
| | 1 | 2 | 3 | 4 | 5 |
| CAT#1 feed rate (mole/min) | 4.71E−07 | 4.71E−07 | 4.71E−07 | 4.71E−07 | 4.71E−07 |
| TMC rac-5 feed rate (mole/min) | 4.71E−08 | 9.43E−08 | 1.41E−07 | 1.41E−07 | 9.43E−08 |
| Polymerization temperature (° C.) | 120 | 120 | 120 | 100 | 100 |
| Propylene feed rate (g/min) | 14 | 14 | 14 | 14 | 14 |
| Isohexane feed rate (ml/min) | 80 | 80 | 80 | 80 | 80 |
| Yield (g/min) | 5.9 | 6.8 | 7.5 | 7.5 | 7.0 |
| Conversion (%) | 42.5 | 48.5 | 53.3 | 53.7 | 50.3 |
| Mn_DRI (kg/mol) | 40.64 | 40.95 | 40.47 | 105.96 | 107.86 |
| Mw_DRI (kg/mol) | 106.56 | 101.04 | 101.94 | 252.56 | 246.00 |
| Mz_DRI (kg/mol) | 230.09 | 169.83 | 179.18 | 448.74 | 444.93 |
| Branching factor* | 0.93 | 0.96 | 0.95 | 0.97 | 0.98 |
| Tc (° C.) | 100.2 | 103.7 | 102.7 | 105.9 | 101.7 |
| Tm (° C.) | 155.4 | 156.1 | 155.7 | 157.6 | 159.1 |
| Tg (° C.) | −3.3 | −4.1 | −4.1 | −3.6 | −1.5 |
| Heat of fusion (J/g) | 25.9 | 40.7 | 52.5 | 45.4 | 37.7 |
| Viscosity @190° C. (mPa · sec) | 78700 | 46000 | 34580 | | |

Branching factor == (g' at Mw/g' at Mz)

TABLE 1b

| | Example # | | | |
|---|---|---|---|---|
| | 6 | 7 | 8 | 9 |
| CAT#1 feed rate (mole/min) | 4.71E−07 | 4.71E−07 | 4.71E−07 | 4.71E−07 |
| TMC rac-5 feed rate (mole/min) | 4.71E−08 | 4.71E−08 | 9.43E−08 | 1.41E−07 |
| Polymerization temperature (° C.) | 100 | 130 | 130 | 130 |
| Propylene feed rate (g/min) | 14 | 14 | 14 | 14 |
| Isohexane feed rate (ml/min) | 80 | 80 | 80 | 80 |
| Yield (g/min) | 6.7 | 5.8 | 6.4 | 6.6 |
| Conversion (%) | 47.5 | 41.3 | 45.6 | 47.1 |
| Mn_DRI (kg/mol) | 113.38 | 24.93 | 25.53 | 25.18 |
| Mw_DRI (kg/mol) | 256.53 | 59.10 | 60.45 | 61.69 |
| Mz_DRI (kg/mol) | 445.78 | 105.08 | 103.02 | 106.04 |
| Branching factor | 0.98 | 0.93 | 0.94 | 0.94 |
| Tc (° C.) | 100.6 | 101.0 | 102.3 | 103.8 |
| Tm (° C.) | 157.2 | 152.6 | 152.9 | 153.0 |
| Tg (° C.) | −1.8 | −4.2 | −4.3 | −5.7 |
| Heat of fusion (J/g) | 21.2 | 23.9 | 47.8 | 57.0 |
| Viscosity @190° C. (mPa · sec) | | 9112 | 9575 | 8537 |

Branching factor == (g' at Mw/g' at Mz)

The tensile strength and stain at break (also referred as elongation) for polymers produced in Examples 1-9 were measured and the data are listed in Table 2.

TABLE 2

| Polymer example # | Tensile strength (MPa) | Strain at break (%) |
|---|---|---|
| 1 | 1.16 | 319.5 |
| 2 | 4.22 | 238.6 |
| 3 | 6.60 | 255.9 |
| 4 | 6.07 | 232.4 |
| 5 | 2.76 | 85.8 |
| 6 | 0.92 | 227.4 |
| 7 | 0.60 | 45.9 |
| 8 | 3.92 | 63.3 |
| 9 | 6.80 | 35.6 |

Polymers produced in examples 7-8 were formulated for adhesive application. All of these three samples were blended with 7 wt % of Sasol C80 wax, 1 wt % of MAPP-40 and 0.5 wt % of Irganox 1010. The blending was carried out at low shear mixing at elevated temperature of about 190° C. Irganox 1010 is a phenolic antioxidant available from Ciba-Geigy. MAPP40 is a maleic anhydride modified polypropylene, having an acid number of 50, a viscosity of 300 mPa·sec at 190° C., and a softening point of 149° C., available from Chusei, USA. Sasol C80 wax is a Fischer-Tropsch wax obtained from Moore and Munger. Inland Paper Board is a high performance box board obtained from Inland Paper Board and Packaging Company of Rome, Ga. It is characterized as a #56 virgin high performance paper board stock. The results are listed in Table 3.

TABLE 3

| | Polymer Example # | | |
|---|---|---|---|
| | 7 | 8 | 9 |
| Set time (second) | 3 | 2.75 | <2.5 |
| Fiber tear (%) @ room temperature on Inland paper board | 84 | 69 | 27 |
| Fiber tear (%) @ 2° C. temperature on Inland paper board | 40 | 50 | 0 |

TABLE 3-continued

| | Polymer Example # | | |
|---|---|---|---|
| | 7 | 8 | 9 |
| Fiber tear (%) @ −18° C. temperature on Inland paper board | 0 | 27 | 0 |
| Viscosity @177° C. (mPa · sec) | 9212 | 9725 | 9550 |

Examples 10-13 were made following the same procedure as used in Examples 1-9. In these examples, dimethylsilyl (tetramethylcyclopentadienyl)(cyclododecylamido)titanium dimethyl catalyst (CAT#3) was employed was used as the first catalyst to produce amorphous polymer component and rac-dimethylsilylene-bis(2-methyl-4-(carbazol-9-yl)inden-1-yl) zirconium dimethyl (TMC rac-5) was used as the second catalyst to produce polymeric component having a crystallinity of 20% or more. Detailed polymerization condition and some characterization data are listed in Table 4.

TABLE 4

| | Example # | | | |
|---|---|---|---|---|
| | 10 | 11 | 12 | 13 |
| CAT#3 feed rate (mole/min) | 2.03E−06 | 2.03E−06 | 2.03E−06 | 2.03E−06 |
| TMC rac-5 feed rate (mole/min) | 3.83E−07 | 8.23E−07 | 7.66E−07 | 9.57E−07 |
| Polymerization temperature (° C.) | 130 | 130 | 130 | 130 |
| Propylene feed rate (g/min) | 14 | 14 | 14 | 14 |
| Isohexane feed rate (ml/min) | 80 | 80 | 80 | 80 |
| Yield (g/min) | 7.0 | 8.8 | 8.1 | 8.9 |
| Conversion (%) | 50.0 | 62.7 | 57.8 | 63.3 |
| Mn DRI (kg/mol) | 10.387 | 10.811 | 10.662 | 10.582 |
| Mw DRI (kg/mol) | 32.078 | 33.073 | 34.337 | 30.734 |
| Mz DRI (kg/mol) | 69.184 | 71.706 | 70.653 | 59.203 |
| Branching Factor* | 0.93 | 0.93 | 0.92 | 0.93 |
| Tc (° C.) | 101.5 | 102.1 | 103.6 | 104.2 |
| Tm (° C.) | 150.6 | 150.7 | 150.9 | 143.1 |
| Tg (° C.) | −11.5 | −10.9 | −10.9 | −11.8 |
| Heat of fusion (J/g) | 30.9 | 44.1 | 52.0 | 63.7 |
| Viscosity @190° C. (mPa · sec) | 1682 | 1790 | 1825 | 1290 |

Branching factor == (g' at Mw/g' at Mz)

Polymers produced in Examples 11 and 12 were formulated for adhesive application. All of these three samples were blended with 7 wt % of Sasol C80 wax, 1 wt % of MAPP-40 and 0.5 wt % of Irganox 1010. The blending was carried out at low shear mixing at elevated temperature of about 190° C. The results are listed in Table 5.

TABLE 5

| | Polymer Example # | |
|---|---|---|
| | 11 | 12 |
| Set time (second) | 3 | 4.25 |
| Fiber tear (%) @ room temperature on Inland paper board | 92 | 10 |
| Fiber tear (%) @ 2° C. temperature on Inland paper board | 71 | 0 |
| Fiber tear (%) @ −18° C. temperature on Inland paper board | 3 | 0 |
| Viscosity 177° C. (mPa · sec) | 1762 | 1667 |
| Hardness Shore C | 60 | 71 |

Examples 14-17

Comparative

Examples 14-17 were made following the same procedure as used in Examples 1-9. In these examples, di(p-triethylsilylphenyl)methylene](cyclopentadienyl)(2,7-di-t-butylfluoren-9-yl)hafnium dimethyl (CAT#1) was employed was used as the first catalyst to produce amorphous polymer component and rac-dimethylsilyl bis(2-methyl-4-phenylindenyl) zirconium dimethyl (CAT#4) was used as the second catalyst to produce polymeric component having a crystallinity of 20% or more. These are comparative examples and were produced under similar polymerization condition to those used for Examples 1-4. Polymer samples produced in Examples 1-4 have much higher melting temperatures and higher viscosity as compared with the polymers produced using CAT#4 catalyst. Detailed polymerization condition and some characterization data are listed in Table 6.

TABLE 6

| | Example # | | | |
|---|---|---|---|---|
| | 14 | 15 | 16 | 17 |
| CAT #1 feed rate (mole/min) | 3.53E−07 | 4.71E−07 | 5.89E−07 | 7.06E−07 |
| CAT #4 feed rate (mole/min) | 4.72E−08 | 4.72E−08 | 4.72E−08 | 4.72E−08 |
| Polymerization temperature (° C.) | 120 | 120 | 120 | 120 |
| Propylene feed rate (g/min) | 14 | 14 | 14 | 14 |
| Isohexane (ml/min) | 80 | 80 | 80 | 80 |
| Yield (g/min) | 9.0 | 8.1 | 8.6 | 7.7 |
| Conversion (%) | 64.1 | 57.5 | 61.3 | 55.2 |
| Tc (° C.) | 104.4 | 104.6 | 102.1 | 103.6 |
| Tm (° C.) | 142.4 | 143.3 | 148.1 | 149.6 |
| Tg (° C.) | −4.2 | −4.8 | −2.8 | −4.1 |
| Heat of fusion (J/g) | 70.1 | 77.0 | 46.0 | 47.7 |
| Viscosity @190° C. (mPa · sec) | 3595 | 3908 | 11080 | 14850 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A propylene polymer comprising a blend of a component having a crystallinity of 10% or less and a component having a crystallinity of 20% or more, said propylene polymer having:
    a) a melting point of X° C. or more where X=−0.0038 $(Tp)^2$+0.36(Tp)+150, where Tp is the temperature of polymerization in ° C., and wherein the polymer has a melting temperature of 150° C. or higher;
    b) an Mw of 10,000 g/mol or more;
    c) a heat of fusion of from 1-70 J/g;
    d) stereodefects per 10,000 monomer units of Y or less where Y=2.35(Tp)−100 (where Tp is the temperature of polymerization in ° C.) for the portion of the blend that is insoluble in hexane at 23° C.;
    e) a dot T-Peel on Kraft paper of 1 N or more; and
    f) a branching factor of 0.98 or less, where the branching factor is the ratio of g' measured at Mz to g' measured at Mw.

2. The polymer of claim 1, where the component having a crystallinity of 10% or less is present at least 2 wt % and the component having a crystallinity of 20% or more is present at least 2 wt %.

3. The polymer of claim 1, wherein X=−0.0038$(Tp)^2$+0.36 (Tp)+158.

4. The polymer of claim 1, wherein the branching factor is 0.95 or less.

5. The polymer of claim 1, wherein the polymer has a melting temperature of 155° C. or higher.

6. An adhesive comprising the polymer of claim 1.

7. The adhesive of claim 6, wherein the adhesive has a dot T-Peel of 5-10,000 N.

8. The adhesive of claim 6, further comprising tackifier.

9. The adhesive of claim 6, further comprising maleated polymer.

10. The polymer of claim 1 wherein the blend is obtained by contacting a monomer composition comprising propylene with a polymerization catalyst system under homogeneous polymerization conditions and at a temperature of about 100° C. to about 195° C., wherein the polymerization catalyst system includes an activator and two catalyst compounds, where the first catalyst compound is capable of producing a polymer having a heat of fusion of 10 J/g or less at said homogeneous polymerization conditions and at a temperature of 100° C.-195° C., and the second catalyst compound is represented by the formula:

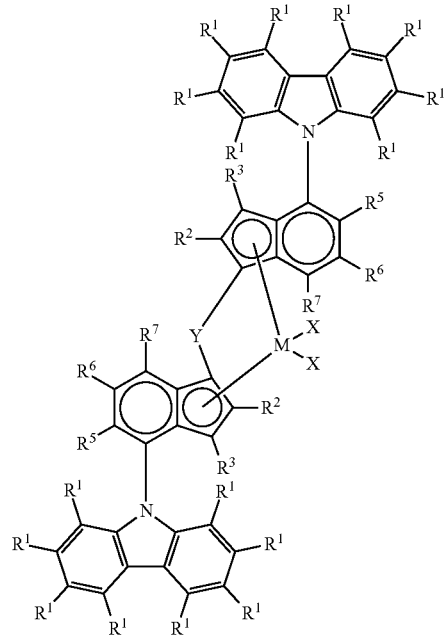

wherein:
M is a transition metal selected from group 4 of the Periodic Table of the Elements;
each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;

each $R^2$, $R^3$, $R^5$, $R^6$ and $R^7$ is independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

Y is a bridging group comprising carbon, silicon or germanium; and each X is, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form an anionic chelating ligand.

11. The polymer of claim 1, wherein the polymer has Mw of 40,000 g/mol or more.

12. The polymer of claim 1, wherein the polymer has a heptane insoluble fraction having a peak melting temperature of 157° C. or more.

13. The polymer of claim 1, wherein the polymer has a Brookfield viscosity at 190° C. of at least 1000 mPa-sec.

14. The polymer of claim 10, wherein the polymer has a melting temperature of 155° C. or higher and a Brookfield viscosity at 190° C. of at least 1000 mPa-sec.

15. An adhesive comprising the polymer of claim 10.

16. The adhesive of claim 6 wherein the polymer has Mw of 40,000 g/mol or more.

17. The adhesive of claim 6 wherein the polymer has a heptane insoluble fraction having a peak melting temperature of 157° C. or more.

18. The adhesive of claim 6 wherein the polymer has a Brookfield viscosity at 190° C. of at least 1000 mPa-sec.

19. The adhesive of claim 6 wherein the polymer has a melting temperature of 155° C. or higher and a Brookfield viscosity at 190° C. of at least 1000 mPa-sec.

* * * * *